United States Patent
Smith et al.

(10) Patent No.: US 11,683,685 B2
(45) Date of Patent: Jun. 20, 2023

(54) TRUSTED IOT DEVICE CONFIGURATION AND ONBOARDING

(71) Applicant: Intel Corporation, Santa Clara, CA (US)

(72) Inventors: Ned M. Smith, Beaverton, OR (US); Edward Agis, San Jose, CA (US); Eduardo Cabre, Chandler, AZ (US); Jeremy Rover, Portland, OR (US); David J. McCall, Dallas, TX (US)

(73) Assignee: Intel Corporation, Santa Clara, CA (US)

( * ) Notice: Subject to any disclaimer, the term of this patent is extended or adjusted under 35 U.S.C. 154(b) by 304 days.

(21) Appl. No.: 16/957,684

(22) PCT Filed: Sep. 28, 2018

(86) PCT No.: PCT/US2018/053588
§ 371 (c)(1),
(2) Date: Jun. 24, 2020

(87) PCT Pub. No.: WO2019/156716
PCT Pub. Date: Aug. 15, 2019

(65) Prior Publication Data
US 2020/0374700 A1 Nov. 26, 2020

Related U.S. Application Data

(60) Provisional application No. 62/628,757, filed on Feb. 9, 2018, provisional application No. 62/656,682, filed on Apr. 12, 2018.

(51) Int. Cl.
*H04L 29/06* (2006.01)
*H04W 12/069* (2021.01)
*H04L 9/32* (2006.01)

(52) U.S. Cl.
CPC ......... *H04W 12/069* (2021.01); *H04L 9/3236* (2013.01); *H04L 9/3247* (2013.01); *H04L 9/3278* (2013.01)

(58) Field of Classification Search
CPC .. H04W 12/069; H04L 9/3236; H04L 9/3278; H04L 2209/127; H04L 9/3268;
(Continued)

(56) References Cited

U.S. PATENT DOCUMENTS

| 8,099,495 B2 * | 1/2012 | Sood | H04L 9/3263 713/1 |
| 8,645,677 B2 * | 2/2014 | Khosravi | H04L 9/0877 713/182 |

(Continued)

FOREIGN PATENT DOCUMENTS

| CN | 103490895 A * | 1/2014 |
| CN | 111543070 | 8/2020 |

(Continued)

OTHER PUBLICATIONS

"International Application Serial No. PCT/US2018/053588, International Search Report dated Dec. 10, 2018", 5 pgs.

(Continued)

*Primary Examiner* — Sher A Khan
(74) *Attorney, Agent, or Firm* — Schwegman Lundberg & Woessner, P.A.

(57) ABSTRACT

Various systems and methods for testing devices, issuing certificates, and managing certified devices, are discussed herein. A system is configured for using platform certificates to verify compliance and compatibility of a device when onboarding the device into an internet of things (IoT) network. The system may use an approved product list to verify compliance and compatibility for the device. When (Continued)

the device is certified, the system may use an onboarding tool to onboard the device into the IoT network.

22 Claims, 14 Drawing Sheets

(58) Field of Classification Search
CPC .. H04L 63/0823; H04L 63/0876; H04L 63/20
See application file for complete search history.

(56) References Cited

U.S. PATENT DOCUMENTS

| | | | | |
|---|---|---|---|---|
| 9,633,197 | B2* | 4/2017 | Lakshmanan | H04W 4/029 |
| 9,753,834 | B1* | 9/2017 | Tang | G06F 11/3616 |
| 10,284,684 | B2* | 5/2019 | Tellado | G06F 21/33 |
| 10,447,683 | B1* | 10/2019 | Loladia | H04W 12/71 |
| 10,560,448 | B1* | 2/2020 | Witten | H04L 63/0823 |
| 10,644,891 | B2* | 5/2020 | Kravitz | H04W 12/06 |
| 2002/0152382 | A1* | 10/2002 | Xiao | G06F 21/604 |
| | | | | 713/173 |
| 2005/0216736 | A1* | 9/2005 | Smith | H04L 63/0823 |
| | | | | 713/168 |
| 2010/0082991 | A1* | 4/2010 | Baldwin | H04L 9/083 |
| | | | | 380/278 |
| 2010/0161969 | A1* | 6/2010 | Grebovich | H04L 9/3247 |
| | | | | 713/176 |
| 2015/0237502 | A1 | 8/2015 | Schmidt et al. | |
| 2016/0063466 | A1* | 3/2016 | Sheridan | G06Q 20/1235 |
| | | | | 705/26.25 |
| 2016/0164884 | A1* | 6/2016 | Sriram | G06Q 10/0833 |
| | | | | 705/51 |
| 2016/0285832 | A1* | 9/2016 | Petrov | H04L 67/60 |
| 2016/0308861 | A1* | 10/2016 | Ameling | H04L 63/0876 |
| 2016/0337127 | A1* | 11/2016 | Schultz | H04L 9/3234 |
| 2016/0364553 | A1* | 12/2016 | Smith | H04L 63/10 |
| 2017/0302663 | A1* | 10/2017 | Nainar | H04L 9/3247 |
| 2018/0109538 | A1* | 4/2018 | Kumar | H04L 63/08 |
| 2018/0184290 | A1* | 6/2018 | Luo | H04L 63/0823 |
| 2018/0189344 | A1* | 7/2018 | Akwule | G06F 16/951 |
| 2018/0189878 | A1* | 7/2018 | Uhr | G06Q 20/3829 |
| 2019/0052464 | A1* | 2/2019 | Doliwa | H04L 63/0807 |
| 2019/0102555 | A1* | 4/2019 | Novak | G06F 21/57 |
| 2019/0296919 | A1* | 9/2019 | Kravitz | H04L 9/3255 |

FOREIGN PATENT DOCUMENTS

| | | | |
|---|---|---|---|
| WO | WO-0179970 A2 * | 10/2001 | ............ G06F 21/105 |
| WO | WO-2012040393 A2 * | 3/2012 | ............ G06F 21/10 |
| WO | WO-2017209859 A1 | 12/2017 | |
| WO | WO-2019156716 A1 | 8/2019 | |

OTHER PUBLICATIONS

"International Application Serial No. PCT/US2018/053588, Written Opinion dated Dec. 10, 2018", 8 pgs.

"International Application Serial No. PCT US2018 053588, International Preliminary Report on Patentability dated Aug. 20, 2020", 10 pgs.

* cited by examiner

```
1   <?xml version="1.0" encoding="utf-8" standalone="yes"?>
2   <CertifiedProductsListingInfo xmlns="http://openinterconnect.org/certifiedproductslisting/schemas/">
3       <Manufacturer>Intel</Manufacturer>
4       <DeviceName>Hood Mountain</DeviceName>
5       <ModelNumber>HM-100</ModelNumber>
6       <HWVersion>1.0.1</HWVersion>
7       <SWVersion>5.0</SWVersion>
8       <FirmwareVersion>1.2.4.1.1.2.3</FirmwareVersion>
9       <OS>Ubunto 6.1.2</OS>
10      <OCFVertical>Smart Home</OCFVertical>
11      <CRSLVersion>4.1</CRSLVersion>
12      <CertificationID>C2018080001A</CertificationID>
13      <CertificationDate>24/01/2017</CertificationDate>
14  </CertifiedProductsListingInfo>
```

*FIG. 6*

TRUSTED IOT DEVICE CONFIGURATION AND ONBOARDING

PRIORITY CLAIM

This application is a U.S. National Stage. Application under 35 U.S.C. 371 from International Application No. PCT/US2018/053588, filed Sep. 28, 2018, published as WO 2019/156716, which claims the benefit of priority to U.S. Provisional Patent Application Ser. Nos. 62/628,757, filed Feb. 9, 2018 and titled "TRUSTED IOT DEVICE CONFIGURATION AND ONBOARDING", and 62/656,682, filed Apr. 12, 2018, and titled "DEVICE COMPLIANCE STATUS ORCHESTRATION USING BLOCKCHAIN AND PKI"; all of which are incorporated herein by reference in their entirety.

TECHNICAL FIELD

Embodiments described herein generally relate to data processing and security authentication techniques, and in particular, to techniques for establishing and implementing functionality for data processing and security authentication for internet of things (IoT) devices and device networks.

BACKGROUND

IoT devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 6 is a code listing illustrating an example of a certified products listing in XML, according to an example;

DETAILED DESCRIPTION

IoT devices may be constructed from several building block technologies such as hardware, firmware, container, operating system. IoT device library, and IoT device application(s). When an IoT device vendor submits a device for conformance testing, the vendor selects a configuration of building blocks upon which the IoT device (library and application) are evaluated. Security, safety, and other factors depend on the particular building block configuration(s); hence, the onboarding tools that may deploy the device may want to know which building block configurations were used to evaluate the IoT device.

In the following description, methods, configurations, and related apparatuses are disclosed for a trusted IoT device configuration and onboarding procedure. The techniques described herein provide the ability to identify trusted platforms and hardware containing approved products.

In previous approaches, only a limited amount of information about a device was exposed to an onboarding tool. This information may include the device vendor, device model, and device version. In many cases this is insufficient information to make an informed decision of whether to onboard the device. The Trusted Computing Group (TCG) has defined a Platform Certificate that identifies the trusted platform and hardware containing a manufacturing certificate and identity, but does not identify the other building block components or the method by which an onboarding tool might determine the security, safety, resiliency, and other properties the device possesses. As a result, the onboarding tool has insufficient information necessary to determine if an IoT device should be onboarded or excluded from a IoT network.

The improved implementation described here identifies the IoT device building blocks used to host the IoT device library and application(s) in two forms. First, an Approved Products List (APL) is used. The APL is a list maintained by the IoT device certifying entity. The second form is a Platform Certificate. The Platform Certificate is a configuration maintained by the Platform vendor responsible for assembling the various IoT device components. These components include the IoT Device library and may include the IoT Device application(s) as well. The APL entity may capture the building block configuration(s) used to validate the IoT Device as part of conformance evaluations in the APL. When the device is presented to the onboarding tool, both the Platform Certificate and the APL are consulted to identify similarities and differences between the configuration used for compliance testing versus what configuration was used in a final product. The onboarding tool may author policies that disposition the discrepancies in ways that achieves the network owner's operational security, safety, and resiliency requirements.

Figure 1:
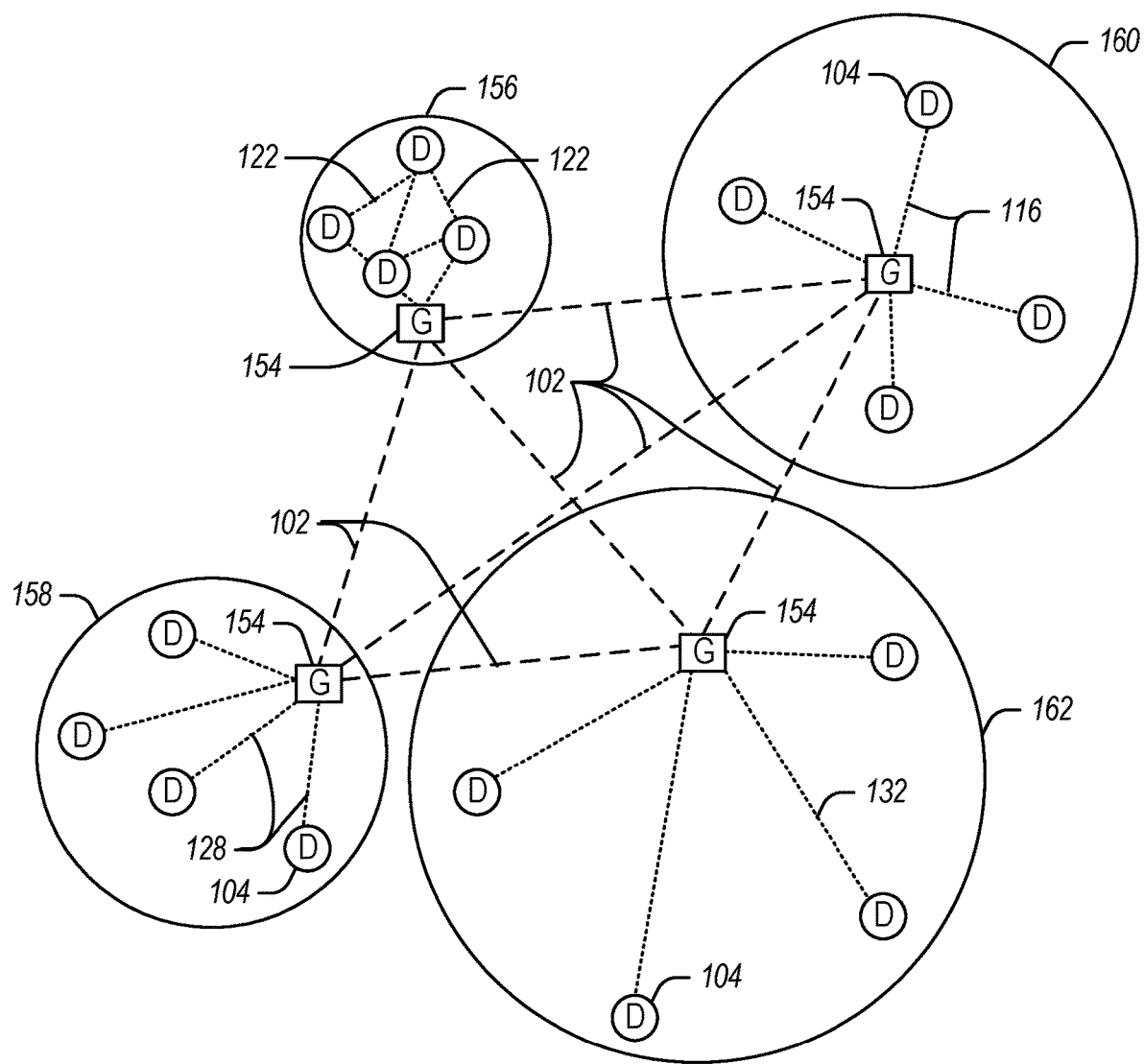
FIG. 1 illustrates a domain topology for respective internet-of-things (IoT) networks coupled through links to respective gateways, according to an example.

FIG. 1 illustrates an example domain topology for respective IoT networks coupled through links to respective gateways. The IoT supports deployments in which a large number of computing devices are interconnected to each other (and to the Internet) to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
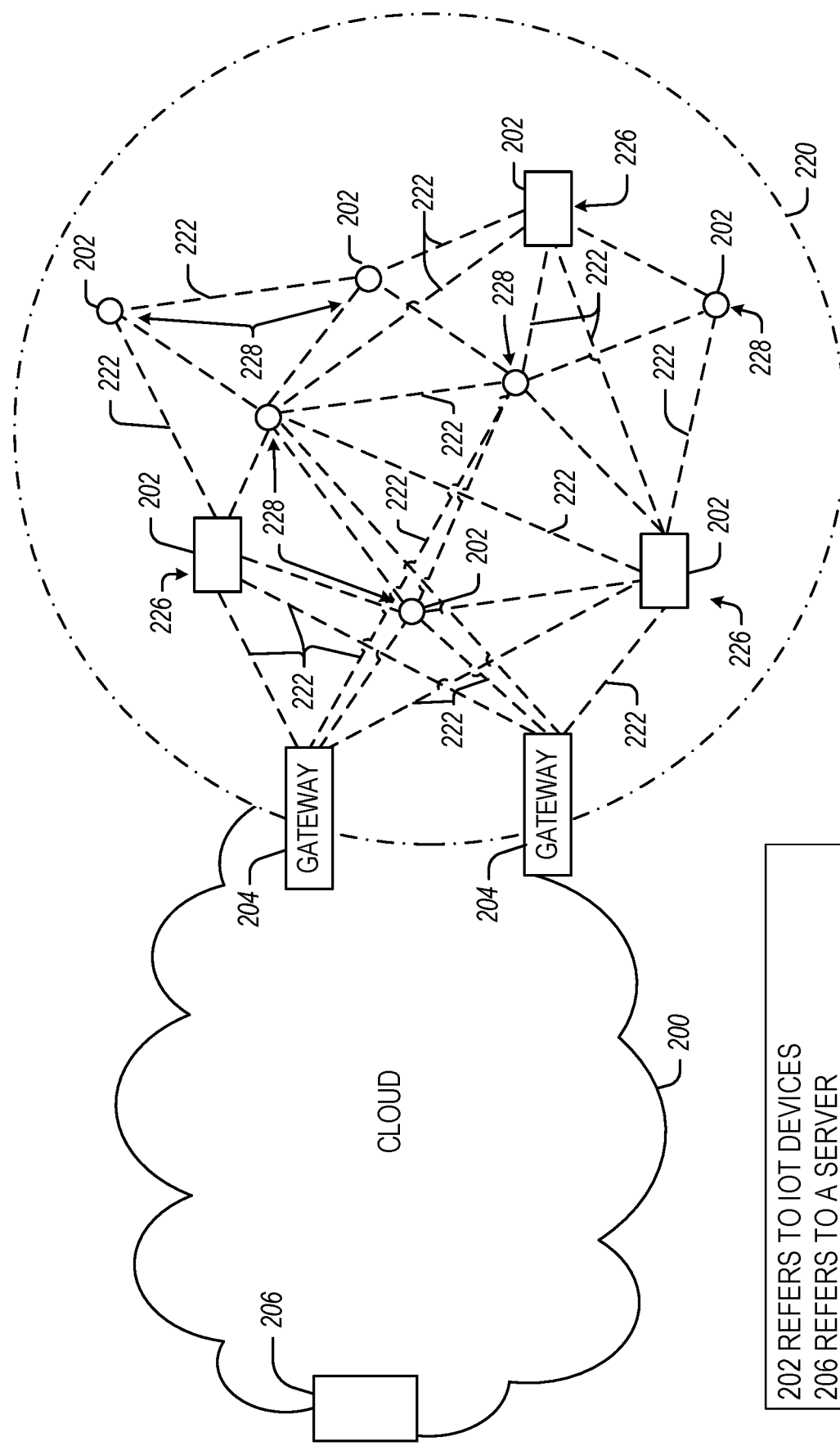
FIG. 2 illustrates a cloud computing network in communication with a mesh network of IoT devices operating as a fog device or platform connected with a cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of IoT networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, or vibration into the autonomous organizations among the IoT devices. The integration of sensory systems may allow systematic and autonomous communication and coordination of service delivery against contractual service objectives, orchestration and QoS-based swarming and fusion of resources. Individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 13 and 14.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog platform in a networked scenario. The mesh network of IoT devices may be termed a fog network 220, established from a network of devices operating at the edge of the cloud 200. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 220 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog platform may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog network 220 device to the server 206 to answer the query. In this example, IoT devices 202 in the fog network 220 may select the sensors 228 used based on the query, such as adding data from flow sensors or temperature sensors. Further, if some of the IoT devices 202 are not operational, other IoT devices 202 in the fog network 220 may provide analogous data, if available.

Figure 3:
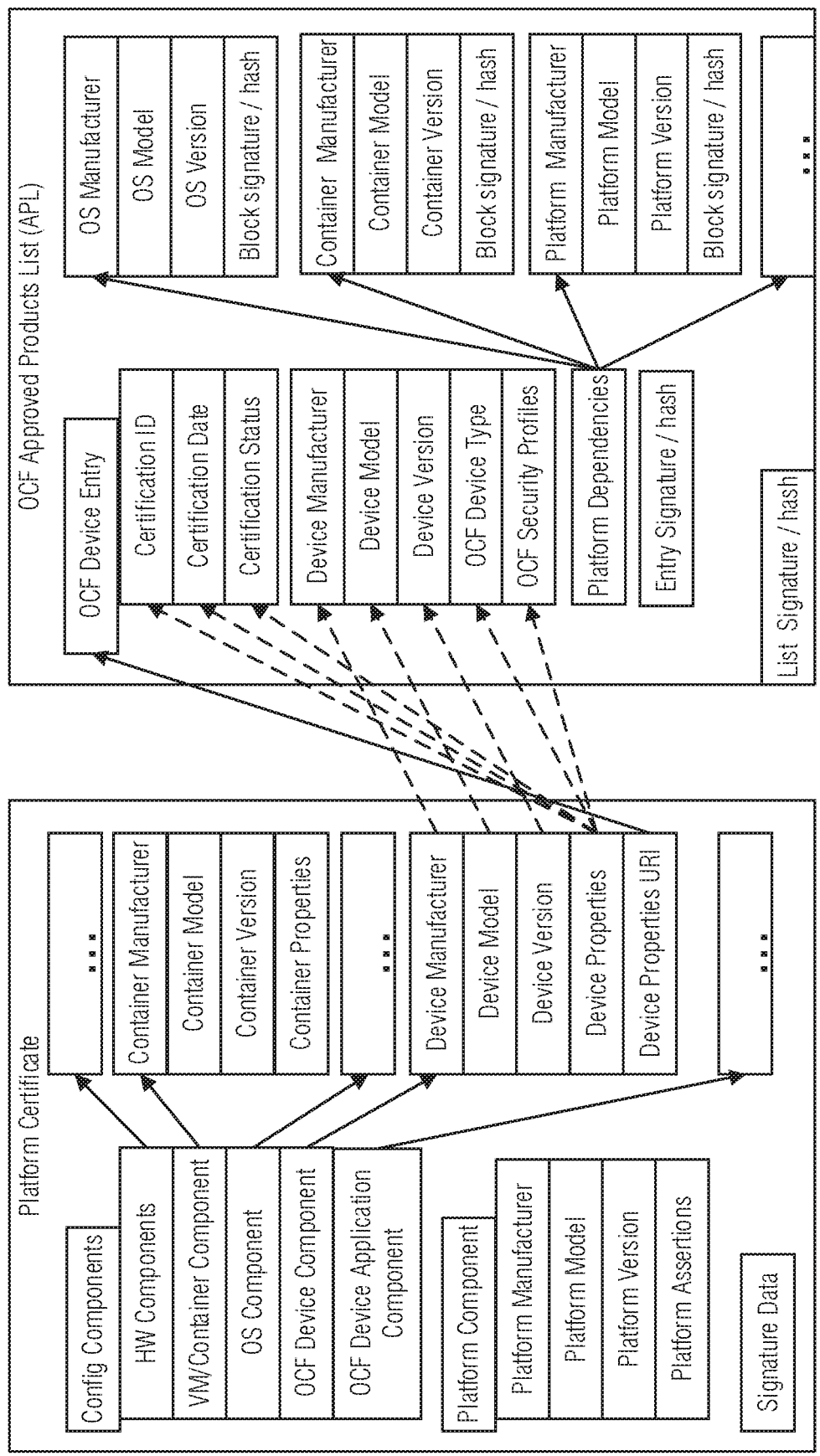
FIG. 3 depicts of a Platform Certificate and an OCF Approved Products List (APL), according to an example.

FIG. 3 depicts an example Platform Certificate and an example OCF Approved Product List (APL). The Platform Certificate and the APL depict a plurality of elements including attributes about hardware or software components, metadata, or the like. The Platform Certificate may describe properties of an actual device, platform, network, or the like. The APL may describe details required to configure a device. The Platform Certificate may be maintained by a platform vendor, such as a vendor that assembled components of the device. The APL may be maintained by an IoT device certifying entity.

An IoT device component may reference an APL entry, such as by directly using a URI or by indirectly replicating some or all of the device properties common to both the Platform Certificate and the APL. The APL or Platform Certificate may contain building block configuration information for a device. The APL may include a configuration used by a testing lab (e.g., an Authorized Test Lab (ATL) to evaluate an IoT device. The Platform Certificate may contain a building block configuration used to form an actual product for sale (e.g., an instance of the IoT device).

In an example, the Platform Certificate or the APL may be digitally signed such that an onboarding tool may verify integrity of the information being presented. The Platform Certificate or the APL may use a hash-tree structure for efficient verification of contents at the level of granularity that best suits onboarding objectives (e.g., of the IoT network where the device is being onboarded).

Lifecycle changes to the APL may be communicated dynamically to the onboarding tool by applying IoT network technology such as Pub/Sub (publish/subscribe) RESTful messaging. For example, when the Certification Status changes from "Certified" to "Not Certified" the onboarding tool may be dynamically notified and that notification may dynamically influence the decision to onboard the device. This example may occur when a change in the APL causes the already onboarded or to be onboarded (but already manufactured) device to have a defect in its Platform Certificate (e.g., an attribute that does not match the changed APL). The onboarding tool may dynamically re-evaluate previously onboarded devices to determine an appropriate quarantine action when an APL attribute changes (e.g., form a subnet consisting of non-Certified devices).

In an example, the onboarding tool is pre-provisioned with trust anchors for both the testing lab and the product vendor issuing the Platform Certificate so that the onboarding tool may verify a signature of the APL or the Platform Certificate, respectfully. There are several ways the onboarding tool may provision the trust anchors. These include provisioning by a local management console, consulting a blockchain containing the public key/certificates, or monitoring computer emergency response team reports that may blacklist trust anchors.

Figure 4:
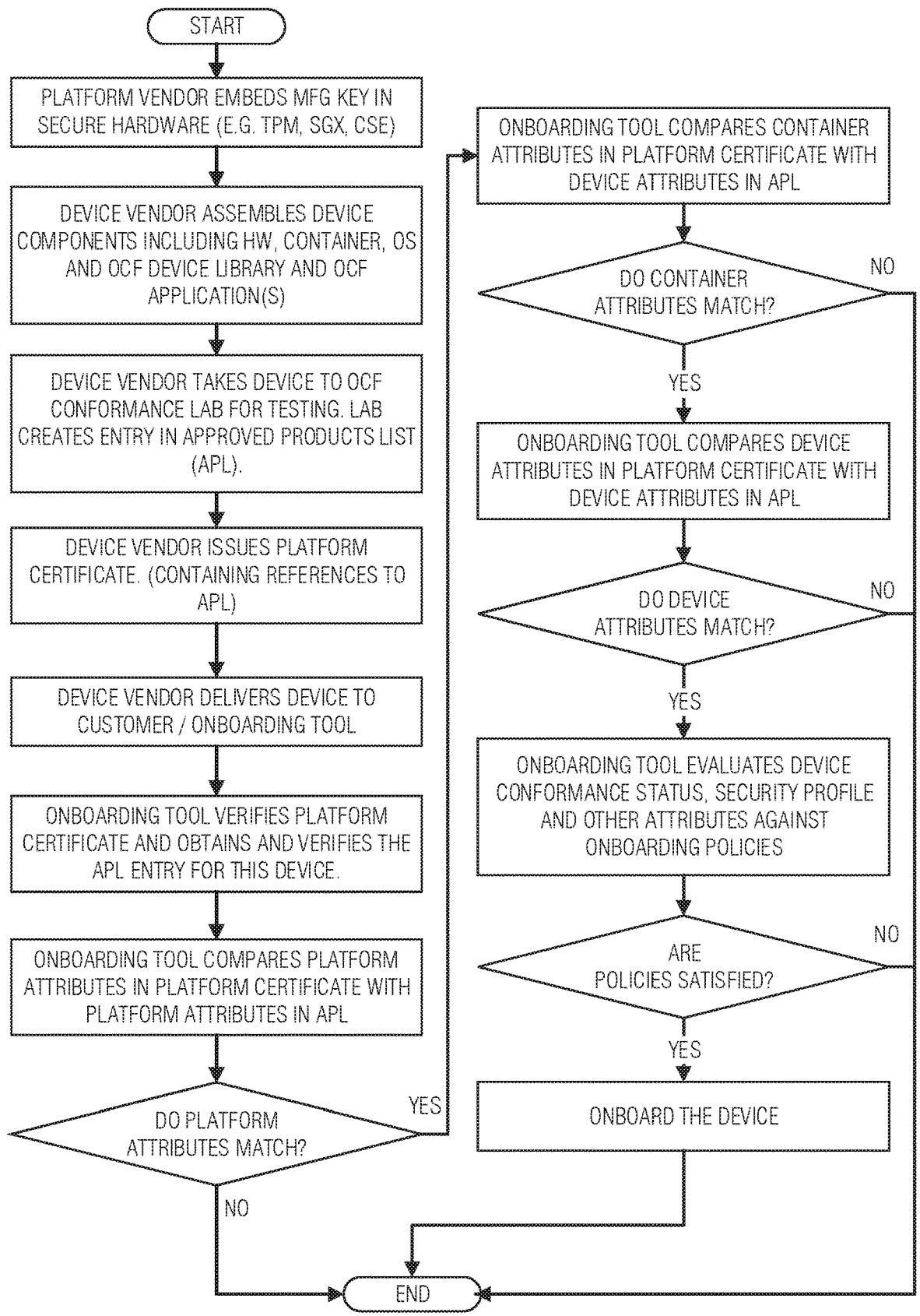
FIG. 4 is a flowchart illustrating a method for a product vendor and product consumer to establish similarities and dissimilarities between the configuration being onboarded versus the evaluated configuration(s), according to an example.

FIG. 4 is a flowchart illustrating a method wherein the product vendor and product consumer (e.g., the onboarding tool) are able to establish similarities and dissimilarities between the configuration being onboarded versus the evaluated configuration (of the APL). Onboarding policies may be used to disposition discrepancies, which result in the network owner being better able to manage security, safety, resiliency, and other IoT network behaviors and risks.

The method illustrated in FIG. 4 and other aspects described herein provide the ability to look up the certification status for a device (e.g., after certified by the onboarding tool). Any client, regardless of security profile, may be able to perform the same certification lookup.

A Certified Product List (CPL) may be made available to a security profile. A bit string may be used to show supported features.

In an example, a platform vendor may embed a manufacturing key in secure hardware of a component. A device vendor may assemble device components to create the device, with applicable device components including hardware, a container, an operating system (OS), an OCF device library, an OCF application, or the like. The device vendor may have the device (once assembled) tested, such as by a compliance testing lab. The compliance testing lab creates an APL entry for the device, which identifies the device's attributes, and which may be compared to a Platform Certificate (issued by the device vendor) by an onboarding tool.

The device may be delivered to a customer. An onboarding tool may verify the Platform Certificate or the APL (e.g., using a blockchain) before comparing elements of the Platform Certificate to the APL. The onboarding tool may determine whether the attributes described in the APL match attributes of the Platform Certificate. In an example, when all attributes do not match, the device may be rejected (e.g., identified by the onboarding tool as Not Certified) and not onboarded. When all (or a minimum or subset as required by the Platform Certificate, the APL, the onboarding tool, or a target IoT network) attributes do match, the device may be onboarded. This comparison process may be iterated for platform attributes, container attributes, device attributes, device conformance status, security profile, onboarding policies, or other attributes or elements of the Platform Certificate or APL as warranted. When the attributes match (e.g., sufficient to identify the device as Certified), the device may be onboarded to the target IoT network or platform.

Figure 5:
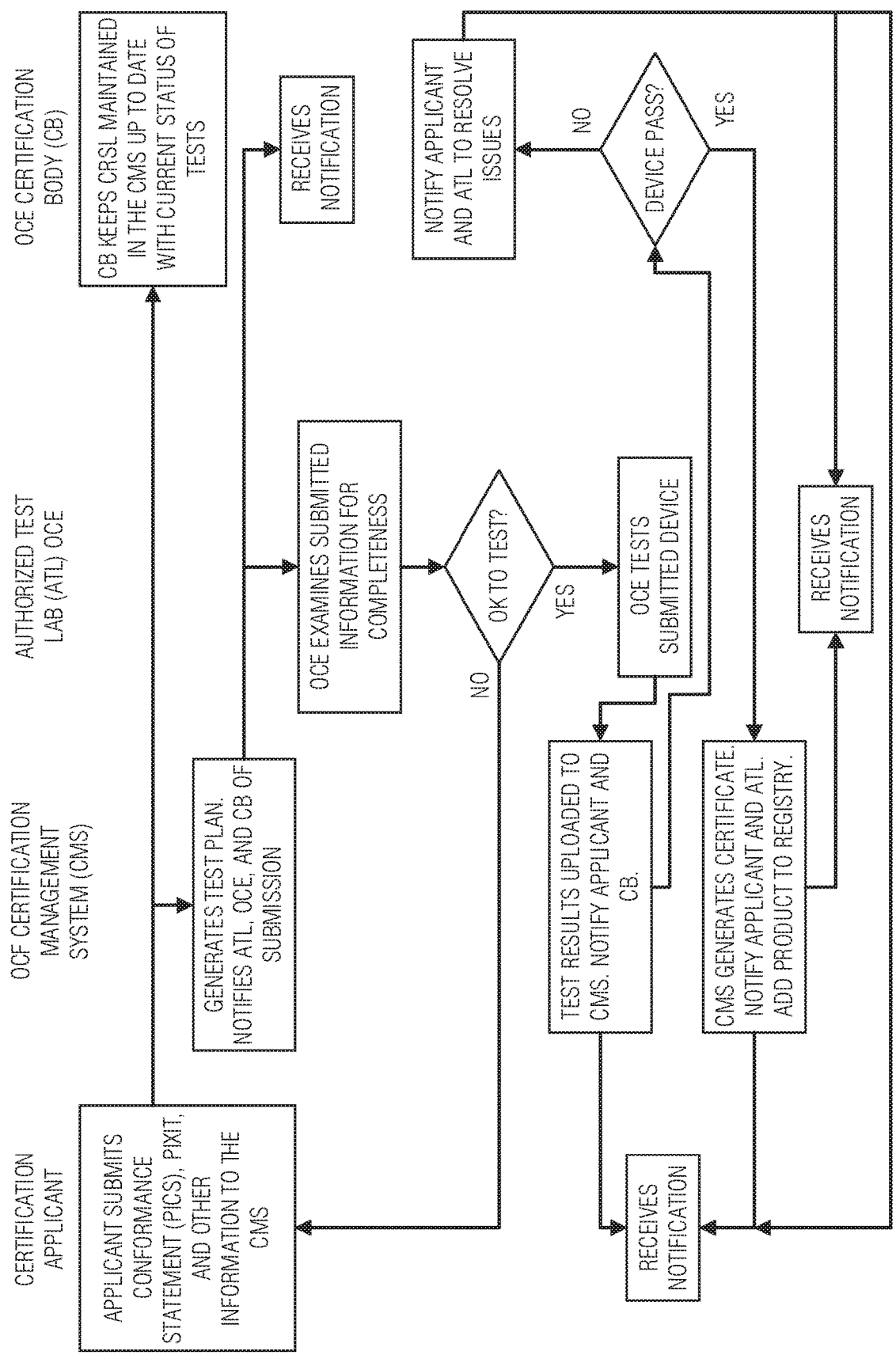
FIG. 5 illustrates a certification process, according to an example.

An example certification process is illustrated in FIG. 5. The onboarding tool may use the certification produced by the certification process (e.g., the Platform Certificate) to ensure that a device that is requested to be onboarded into a network conforms to certain hardware, software, firmware, or other features consistent or compatible with the network.

The certification management system (CMS) generates a certificate (e.g., a Platform Certificate) when the devices passes the tests. The certificate may be produced in a publicly-available form, such as a paper certificate or viewable on a publicly-accessible website, for example. Additionally, the certificate may be saved as an entry in a CPL data store (e.g., database, listing, repository, ledger, data set, or other collection or organization of information). The CPL data store may be accessed to produce a machine-readable or OCF-signed document for use during onboarding, provisioning, auditing, or other uses. In various examples, the CPL data store (and other data stores or sources discussed herein) may be distributed or coordinated among multiple entities, or operated in aspects of blockchain and distributed ledger configurations. Further, such data stores may include aspects of caching, remote/local data management, including to provide redundant or offline availability of data.

The CPL may include OCF authorized data, where the OCF is the primary authority and the only party authorized to make changes. Such data may include, but is not limited to, operating system version. OCF Vertical. Certification Requirements Status List (CRSL) Version, Certification ID, Certificate Date, ICS Data (features supported), or Pass/Fail results of tests.

Other information in a CPL may be provided from another source, such as a device manufacturer. The information may be provided at the time of certification. If the information changes for a particular device (e.g., a new version of the device is released), then the certification may be invalidated. Additional information includes, but is not limited to, a manufacturer, a device name, a model number, a hardware version, a software version, a firmware version, or the like.

OCF authoritative data stored in the CPL may represent the certification status of the device. Used together with manufacturer provided data, a third party is able to verify the certification status of a device claiming to be "OCF Certified."

In an example the CMS generates a test plan based on applicant submitted information. The applicant submitted information may also be sent to an OCF certification body (CB), which may keep the CRSL maintained in the CMS up to date with current status of tests for a device or devices. The CMS may send the device or information about the device to be tested to an authorized test lab which examines the submitted information for completeness. The CMS may also notify the CB that the information was sent for testing.

When the authorized test lab determines the information is complete, an OCF test of the submitted device or device information may occur. If the information is incomplete or not eligible for testing, the certification applicant may be notified. After testing, the test result may be uploaded to the CMS, and the applicant or CB may be notified. When the device passes, the CMS is notified and the CMS generates a certificate, notifies the applicant and creates an APL. The product may be added to a registry. When the device fails, the applicant may be notified to resolve issues. The results of testing may be sent to the CB.

FIG. 6 is a code listing illustrating an example of a certified products listing in XML, according to an example. The CPL includes several pieces of manufacturer-provided information, such as the manufacturer and device name, and OCF authorized data, such as OCF Vertical and Certification ID.

Figure 7:
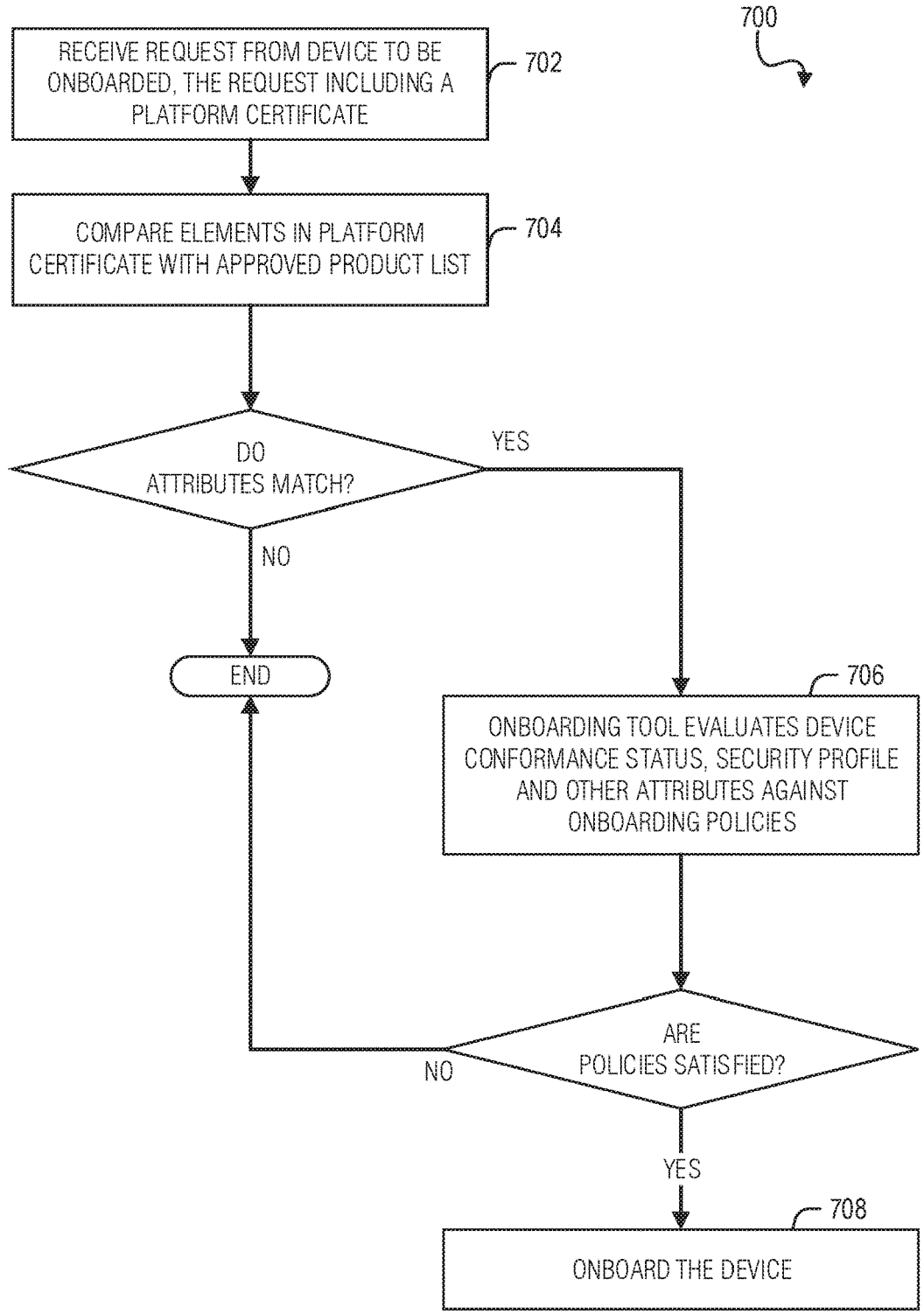
FIG. 7 is a flowchart illustrating a method for using platform certificates to verify compliance and compatibility of a device at a time of onboarding the device into an internet of things (IoT) network, according to an example.

FIG. 7 is a flowchart illustrating a method 700 for using platform certificates to verify compliance and compatibility of a device when onboarding the device into an internet of things (IoT) network, according to an embodiment. It will be understood that this method (and the other techniques discussed herein) may be applicable to other types of device and network configurations, including FOG, Multi-Access Edge Computing (MEC). Edge/Edge Cloud, Cloud, Distributed, and other network configurations where device chain of custody checking is a condition of onboarding.

At 702, an onboarding tool receives a request to be onboarded from a device. The request may be provided by the device directly, such as with a broadcast communication protocol (e.g., Bluetooth), or may be initiated by a user (e.g., administrator) of the device. The request includes a platform certificate of the device.

At 704, the onboarding tool compares elements in the platform certificate with elements from a corresponding approved product list. The elements may be platform attributes, container attributes, device attributes, conformance status, or security profile attributes.

At 706, if the attributes from the platform certificate match the corresponding attributes in the corresponding approved product list, then the onboarding tool uses a policy data store (or, policy set, policy master profile, including data among one or multipole profiles) to determine whether the device should be allowed on the IoT network.

At 708, in response to the device satisfying policies in the policy data store, the device is onboarded to the IoT network.

Figure 8:
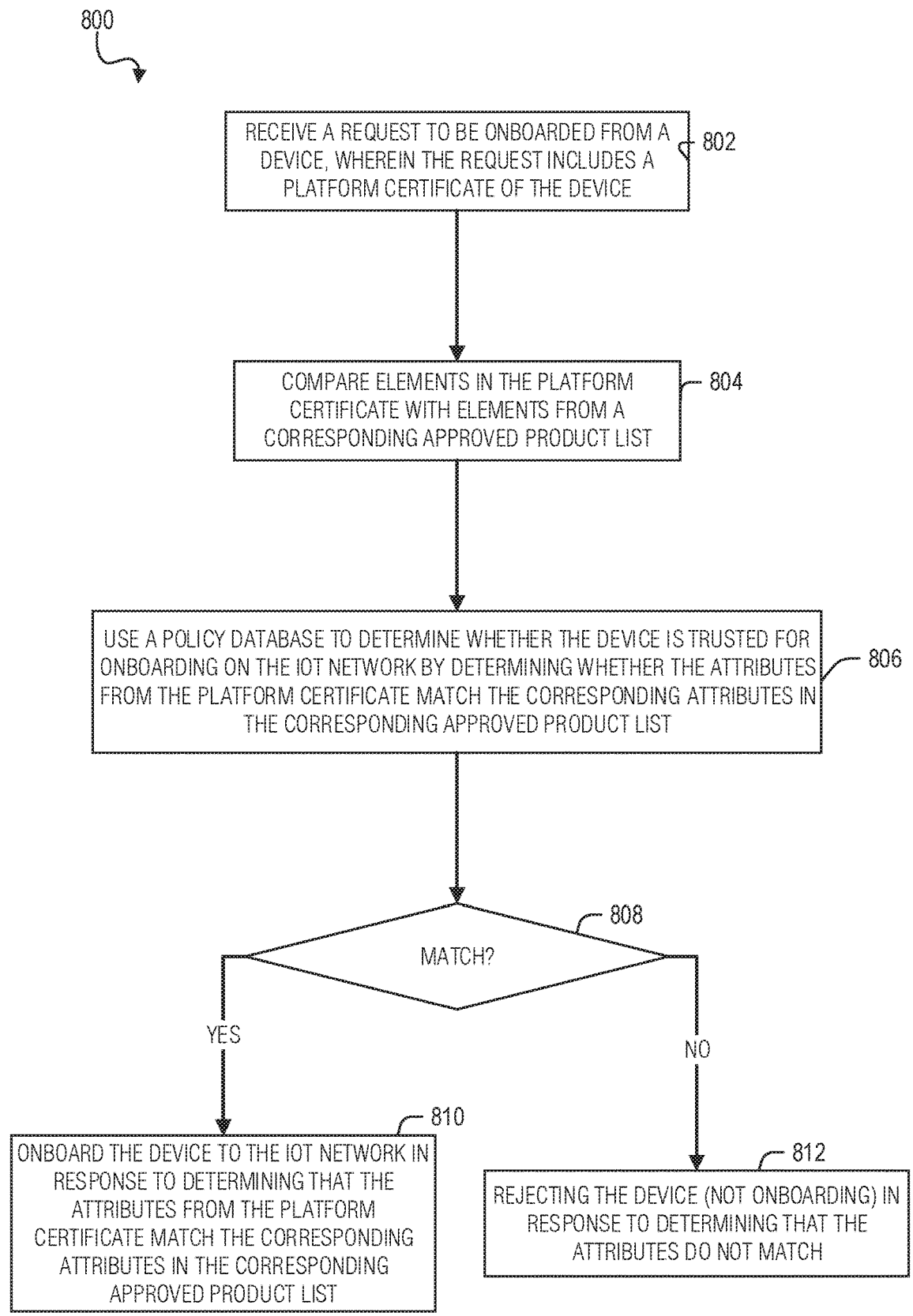
FIG. 8 is a flowchart for using platform certificates to verify compliance and compatibility of a device when onboarding the device into an internet of things (IoT) network according to an example.

FIG. 8 is a flowchart illustrating a method 800 for using platform certificates to verify compliance and compatibility of a device when onboarding the device into an internet of things (IoT) network according to an example. The method 800 includes an operation 802 to receive, at an onboarding tool, a request to be onboarded from the device, wherein the request includes a platform certificate of the device.

The method 800 includes an operation 804 to compare elements in the platform certificate with elements from a corresponding approved product list. In an example, the elements in the platform certificate comprise platform attributes, container attributes, device attributes, conformance status, or security profile attributes. In an example, the approved product list is maintained by an IoT device certifying entity. The platform certificate may be a configuration maintained by a platform vendor that assembled components of the device.

The method 800 includes an operation 806 to use a policy data store to determine whether the device is trusted for onboarding on the IoT network by determining whether the attributes from the platform certificate match the corresponding attributes in the corresponding approved product list. The method 800 includes an operation 808 to determine whether a match exists.

The method 800 includes an operation 810 to onboard the device to the IoT network in response to determining that the attributes from the platform certificate match the corresponding attributes in the corresponding approved product list. In an example, onboarding the device includes determining that the attributes from the platform certificate match the corresponding attributes in the corresponding approved product list for all platform attributes, container attributes, device attributes, conformance status, security profile attributes, or the like, as identified for the device.

The method 800 includes an operation 812 to not onboard the device (e.g., reject the device) in response to determining that the attributes do not match. The method 800 may include determining a change to the approved product list for the device, and dynamically determining whether to change a certification status of the device in response. In an example, when at least one attribute from the platform certificate no longer matches a corresponding attribute in the changed approved product list, the certification may be revoked, and the device may be removed from the IoT network.

The method 800 may include verifying, for example at the onboarding tool, that the approved product list applies to the device (e.g., separately from verifying a match between the approved product list and the platform certificate). This may be done using a local management console, a public blockchain, a blacklist, or the like. The approved product list may have a digital signature for verifying. In another example, verifying may include checking a manufacturing key that was embedded, by a platform vendor, in secure hardware of the device. In an example, the onboarding tool may determine the approved product list applies to the device using a hash-tree structure.

In the remaining paragraphs, methods, configurations, and related apparatuses are disclosed for establishing and using a blockchain, specifically a blockchain for ensuring or verifying compliance in network operation settings.

Previously, compliance to a conformance test, security evaluation criteria, and quality assurance criteria have been acknowledged by printing a paper document or PDF of a paper document signifying compliance. A product may fall out of compliance when subsequent revisions are brought to testing labs. Compliance with previous revisions may not be re-verified when a new revision/brand is vetted. In compliance tests involving security evaluations, changes to the configuration of the system may result in loss of a prior successful compliance. Product firmware or software can be updated in the field resulting in loss of compliance. Compliance status is a dynamic attribute of a product that is not easily assessed by a user ex-post-facto.

Publication of compliance information by an evaluation lab is often privacy sensitive as it may inform the industry relative to new product launch dates, product categorization information, and product inventories in the supply chain. Vendors and evaluation labs often enter into business agreements to keep sensitive compliance information secret—at least temporarily.

Compliance to conformance testing such as Zigbee Alliance, WiFi Alliance, Open Connectivity Foundation, Bluetooth SIG etc., and security evaluation such as FIPS-140-2/3, TCG Common Criteria Protection Profile and quality testing criteria such as ISO9000 are ecosystem entities that contribute to the trust and viability of a product. Publication of PDF documents using a web site has also been used as a conventional way to distribute compliance status. Additionally, a Platform Attribute Certificate may contain compliance status information where LDAP or other certificate directory repositories may be used to publish compliance status. As another example, SIG specific branding can imply compliance. For example, a USB3 brand suggests to a buyer that the product complies with applicable standards.

However, these conventional approaches do not consider changes in compliance status. Compliance status is important to Cloud, IoT and Edge orchestration systems that seek to verify compliance status of computing devices that may interact with a user's network. Compliance status is a trust vector that augments trusted computing objectives. However, an inability to obtain dynamic, machine readable status makes it impractical for orchestration and network onboarding tools to do a context sensitive check or to re-check status periodically.

Systems and methods are disclosed to use a public blockchain, a private network or blockchain, or a combination thereof to maintain compliance status information for one or more compliance providers. Compliance status may be synchronized across a number of compliance maintainer nodes that also serve as compliance publishing nodes according to a publish-and-subscribe system. Verifiers, such as onboarding orchestration tools may both query compliance status or be triggered by compliance status updates occurring dynamically within the supply chain ecosystem.

The systems and methods described herein provide orchestration tools that are more readily able to verify security and brand trust when devices enter a network or when loss of compliance is detected than previous solutions. Compliance has both interoperability and security implications that can change when firmware or software are updated and when compliance tests are modified. The systems and methods described herein more effectively accommodate compliance dynamism in a supply chain and in post deployment operations than previous solutions.

With an example usage of a blockchain, the onboarding tool may have read access only to the blockchain, and a platform vendor or manufacturer may have only write access to the blockchain. The blockchain may be public or private, or both may be used. The private blockchain may include nonpublic supply chain information that is embargoed until a release date of a component of the device, for example, while the public blockchain includes public supply chain information. In another example, portions of a blockchain may be public while other portions are private (e.g., a set of blocks may include unique access rights or may encrypt private information using encryption keys known only to the vendor or manufacturer and the peer enforcing access rights). The blockchain may include information corresponding to platform certificates or approved product lists of a plurality of devices in an example.

Figure 9:
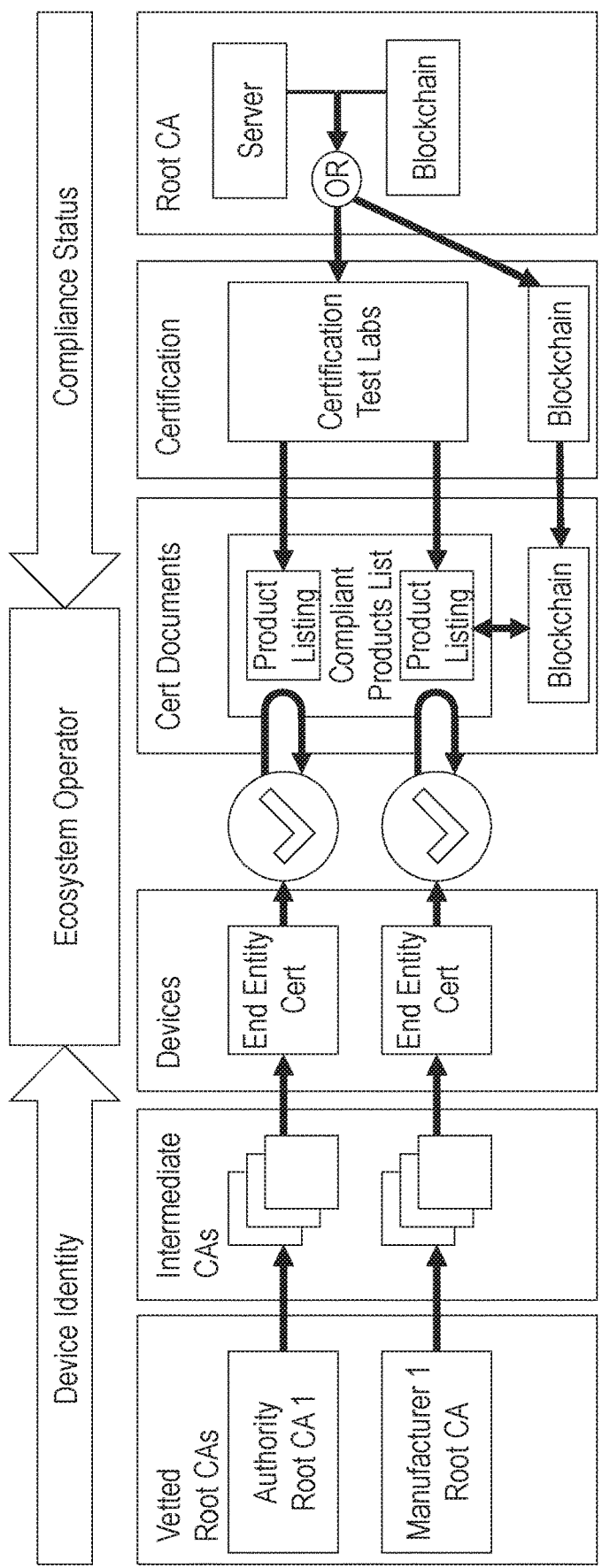
FIG. 9 illustrates a device identity verification implementation, according to an example.

FIG. 9 illustrates a device identity verification implementation, according to an example. In FIG. 9, an ecosystem operator acts as a controller or interface, such as between one or more devices and a certification entity or system, such as a blockchain or server. The ecosystem operator may be also implemented by an onboarding tool, device manufacturer or like service within the supply chain or post deployment management service.

The ecosystem operator may perform onboarding, commissioning, or may act as a verifier. The ecosystem operator may be augmented to include verifying other types of compliance, or evaluation results, such as conformance test labs results. The ecosystem operator may act as an interface or coordinator between a device and a blockchain, in an example, which is described in further detail below with respect to FIG. 10.

In the example shown in FIG. 9, the ecosystem operator may coordinate device identity with compliance certification. The compliance status results may be published generally using a server hosted database or with a blockchain. The blockchain processing nodes may additionally store certification information related to a device and host a database of compliance status results where the blockchain blocks may be used to verify the integrity of database contents. In an example, the blockchain may include or be associated with more than one blockchain, such as a public blockchain and a private blockchain. In an example, the public blockchain may be used for public compliance or device identification information and the private blockchain may be used for confidential, private, or time sensitive information (e.g., information to be published or made public after a date or event).

In an example, the ecosystem operator of FIG. 9 may be used to identify a device and determine whether the device is compliant with a particular ecosystem or standard (e.g., compliant with an OCF specification). After the ecosystem operator determines a device identity or that a device has a particular certification, the ecosystem operator may allow the device access to a service or network (e.g., access a cloud, join a network, activate actions, etc.). In an example, device identification or end entity certification may include certification of a device's attributes, such as a vendor, model, version, or the like. The ecosystem operator may determine or assign a particular security level to a device based on certifications.

In an example, the device identity may be determined based on an asymmetric key pair embedded in the device at manufacturing time. A manufacturer or vendor may add attestation criteria, such as additional consideration/assurances/criteria to ensure that the embedded key is protected or verifiable. A Software Identification (SWID) tag (such as may be described in international standard ISO/IEC 19770-2:2015) may be used as a device identity (e.g., for a software subcomponent). A SWID tag includes a composite identifier containing "manufacturer", "model," and "version" information. The SWID may be used to disambiguate various software ingredients that make up a device or platform. In an example, a combination of SWID tags, SW hash values, and an asymmetric key may be used to create a device or platform identifier (e.g., using a Device Identifier Composition Engine (DICE) Architecture as described by the Trusted Computing Group).

A self-sovereign identity blockchain is a mechanism for individual assertion of identity (identifiers) that may be published through the blockchain such that blockchain members agree (or vote) regarding which asymmetric key possesses which identifier. A manufacturer of devices or platforms may assert sovereign device identity by using a device asymmetric key to sign a blockchain transaction containing the device identity. In an example, an infrastructure provider may generate a device identity according to ISO/IEC JTC 1/SC 27/WG 4 N 2391 specification and then contribute the device identity to a sovereign identity blockchain as another way of making device identity sovereign.

The ecosystem operator may access different ecosystems (e.g., use different root RCAs), to check signing of a device or devices. For example, the ecosystem operator may have multiple trust anchors that pertain to different ecosystems, such as OCF compliance status, security assurances, identification verification. ZigBee compliance status, Bluetooth compliance status, etc. In the example discussed further below using a blockchain, each authority may have a right to write to the blockchain on only its competency (e.g., an OCF root CA may only write to OCF certification status for a device, access to which may be controlled by the ecosystem operator). Each miner may have its own identity key, and may have a PKI on top of the identity key.

Maintaining a device identity with the blockchain allows multiple vendors to contribute to the platform (blockchain) when a device identifier is present for that vendor. For example, a secure storage device may have a cryptographic service provider or a hardware security module, key protection with physical isolation properties, or the like.

In an example, different components of a device may come online at different times. For example, a security module manufacturer may make product information available using the blockchain to publish existence of the module to allow others to know about the module and use it (or buy it). In another example, a component may need to be private, for example up to a release date (e.g., a secure element in a not-yet-released mobile device, manufacturer of the secure element may be hidden until the mobile device with the particular component is made public). The supply chain may have private interactions between supplier using a private blockchain separate from a public blockchain.

In an example, multiple logical devices may be stored on the platform (blockchain). For example, a platform identity may be registered for a device (e.g., an initial device ID), and use that platform identity as a single shared manufacturing identity. Different components (for example having different SWID tag values) may then be assigned (e.g., in an OCF or other IoT software context) where each logical device (e.g., called local device id) may have its own id for blockchain and security identification (where device ID refers to the instance of the device and SWID refers to a class of software of which there may be multiple identical instantiations on different devices).

Figure 10:
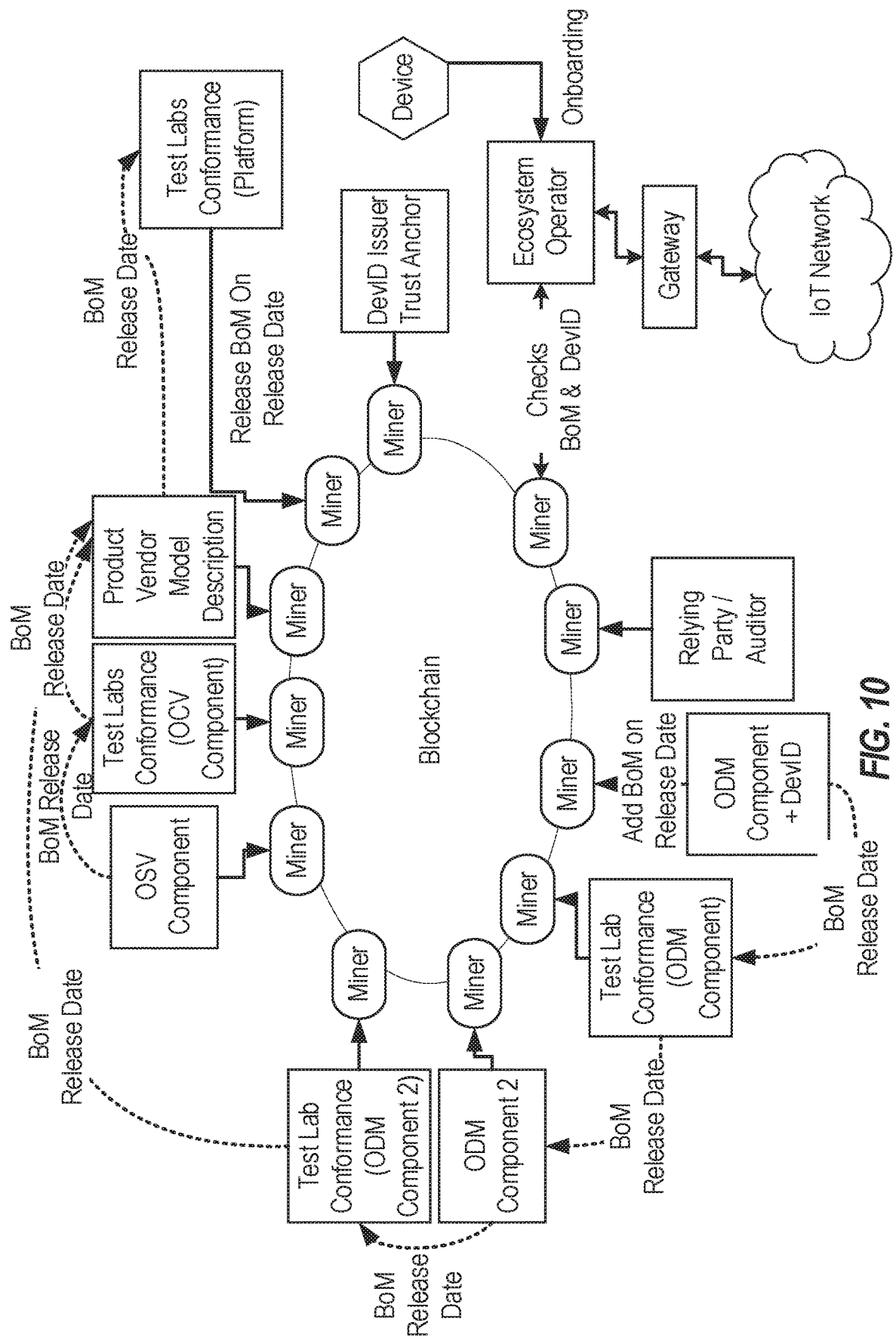
FIG. 10 illustrates an example compliance blockchain implementation, according to an example.

FIG. 10 illustrates an example compliance blockchain implementation, according to an example. FIG. 10 shows an example of the blockchain and ecosystem operator described above in a supply chain provider ecosystem. In an example, the providers cooperate to coordinate the release of a vendor product including multiple component ingredients (e.g. hardware, firmware, software and DeviceID) such as defined by a Bill-of-materials (BoM). In an example, a target release date of the vendor's product is agreed to remain private (e.g., not disclosed to a public blockchain until the target date passes). This ensures that entities monitoring the blockchain do not infer a product release date or expected quantities of a particular product. For private aspects of the ecosystem, a separate private blockchain or private portion of a blockchain may be provided. In an example, the private blockchain may be represented by the dotted lines, with the public blockchain represented by solid lines. In an example, the private blockchain remains private until the BoM release date, after which aspects of (or the entire) private blockchain may become public.

Subsequent to the release date, ingredient suppliers may contribute component information to the blockchain for public use. For example, the Ecosystem Operator may validate product ingredients to match an existing product BoM as a condition of onboarding.

An ingredient or component supplier may release an ingredient or component for general use at any time if not constrained by a product vendor agreement that specifies a release date in the future. Other ingredient or component suppliers or product vendors may incorporate the first ingredient or component into a second or into a final product by linking the second ingredient or component BoM to the first ingredient or component BoM found on the blockchain. A BoM also may include the supplier, model, version, and other information such as a hash of firmware/software associated with the ingredient or component.

Each ingredient or component may be evaluated by an ingredient or component test and compliance validation service provider that contributes evaluation results/status to the blockchain. Evaluation labs may also be constrained by release date contracts that prevent premature disclosure of evaluated ingredients, components or platforms to the public blockchain.

A DeviceID issuing authority may generate one or many unique device identifiers, for example one for each instance of a product or ingredient included in a product such that the final product contains at least one DeviceID. The issuer may generate a document that associates the DeviceID instance with the ingredient or product (e.g. a model number that is specific to the ingredient or product—and can be regarded as a class identifier). The issuer digitally signs the document that is contributed to the blockchain establishing a binding or association of the ingredient instance to the ingredient model (or class). The DeviceID may be used as an instance identifier. The signed document may be regarded as a Digital Certificate such as is defined by RFC 5280 (X.509) or a signed document as defined by RFC 8152 (COSE).

Release of the DeviceID and model signed document to the blockchain may be constrained by the release date agreement. The DeviceID issuer may supply a trust anchor (e.g., a hash of a public issuing key) to the blockchain, which may be controlled by the ecosystem operator. For example, the issuer may be an X.509 PKI Certificate Authority or may be a record in an infrastructure provider directory and may publish its root CA public key or directory location to facilitate onboarding verification by the ecosystem operator.

Subsequent to a release date, all the ingredients or components necessary to support an onboarding operation by the ecosystem operator using the blockchain are in place. The ecosystem operator (EO) onboarding process may query the device to be onboarded to identify a product model number. The EO may use the product model number to locate a BoM record from the blockchain that in turn identifies other BoM records in a cascade of references that together defines the product ingredients.

In an example, at least one of these ingredients contains an embedded DeviceID (e.g., IEEE 802.1AR) that may be used to digitally sign and otherwise prove to the EO that it has possession of the private key portion. For example, the ingredient may be a TCG Trusted Platform Module (TPM) that contains the DeviceID and TCG defined restricted keys that may attest the presence of the DeviceID on the TPM which has known key protection properties.

The EO may further require the device to be onboarded to sign the BoM that describes the product composition and may further engage in a key exchange protocol such as TLS or Diffie-Hellman to establish a secure communications channel between the EO and the device being onboarded.

The EO may verify the DeviceID signature by obtaining the issuer public key, generating a hash of the BoM or digital certificate and comparing the encrypted hash with the signature associated with the signed document. It is understood that a contribution of a BoM to the blockchain may constitute a digital signing operation using the contributors private key. The contributor may further contribute a digital identity certificate containing identification attributes such as the vendor's name.

The EO may verify all signed BoM documents and the identities of BoM ingredient providers according to a list of trusted keys also known as trust anchors. The EO may construct the trust anchor list by observing blockchain transactions involving the various ingredient providers to establish trustworthiness in the blockchain participants. Additionally, a first trusted participant may introduce a second participant to the EO and in so doing conveys trust in the second participant.

The EO may further verify the ingredient BoM by comparing a BoM supplied by the device with a BoM found on the blockchain where a corresponding test lab may contribute a test status result.

The EO may further verify the device authenticity by requesting a device attestation where a secure/measured/protected boot process (e.g., TCG Measured Boot) result produces a hash value or values that matches hash values supplied as part of one or more ingredient BoMs found on the blockchain. The EO may apply a whitelist, blacklist or greylist policy based on BoM hash values found on the blockchain such that a whitelist hash authorizes onboarding to continue, blacklist policy prohibits onboarding continuation and greylist triggers auditing, containment or other remedial action to limit the exposure of the device to other already onboarded devices. For example. Network Access Control (NAC), Network Access Protection (NAP). Trusted Network Communications (TNC), RADIUS and 802.1X.

In an example, the DeviceID may be an Enhanced Privacy ID (EPID) to be used as a device identifier. The private blockchain or aspects of the blockchain kept private until the BoM release date may include a permission blockchain to coordinate nonpublic supply chain information to maintain privacy until the release date. The permission blockchain may include a subset of members or venders with permission read or permission write that only have access when allowed by the ecosystem operator, for example. The permission blockchain may allow for supply chain participants to have write access to the blockchain, and the ecosystem operator to have read access only. In an example, the read access may be removed from the ecosystem operator for a permission blockchain to keep the information private.

As is understood, a blockchain is a distributed data store (e.g., distributed ledger or data storage system) that maintains a growing list of data records that are hardened against tampering and revision. A blockchain includes "blocks," which hold data or both data and programs. Each block holds batches of individual "transactions" between blockchain participants. Each block includes a timestamp and linking information (usually a hash value) linking the current block to the previous block; the linking information allows traversal of the blockchain (in either direction).

Blockchain transactions may be integrity protected using a distributed hashing algorithm that requires each transaction processor (e.g., "miner") to agree to the next block in the blockchain. Integrity is achieved through a consensus of multiple miners (e.g., via a vote), each miner having access to its own copy of the ledger. If a majority of the miners agree on the contents of the ledger, then those agreed upon contents become the "truth" for the ledger; the miners that disagree will accept the truth of the majority. Integrity is provable because an attacker would have to compromise a majority of miners and modify their copies of the ledger; this is extremely difficult (if not impossible).

In an example, the blockchain implementation may involve use transactions performed among participants to enable of zero knowledge commitments, and zero knowledge proof of knowledge of verification, using information written to the blockchain. Such techniques may allow enhanced privacy of data written to the blockchain in connection with network operations (e.g., to keep details of contracts or network participants secret). In an example, a zero knowledge proof applied in this scenario includes steps— (1) commitment of secret data to the blockchain, and (2) proof of knowledge of the secret data, using a cryptographic protocol.

Figure 11:
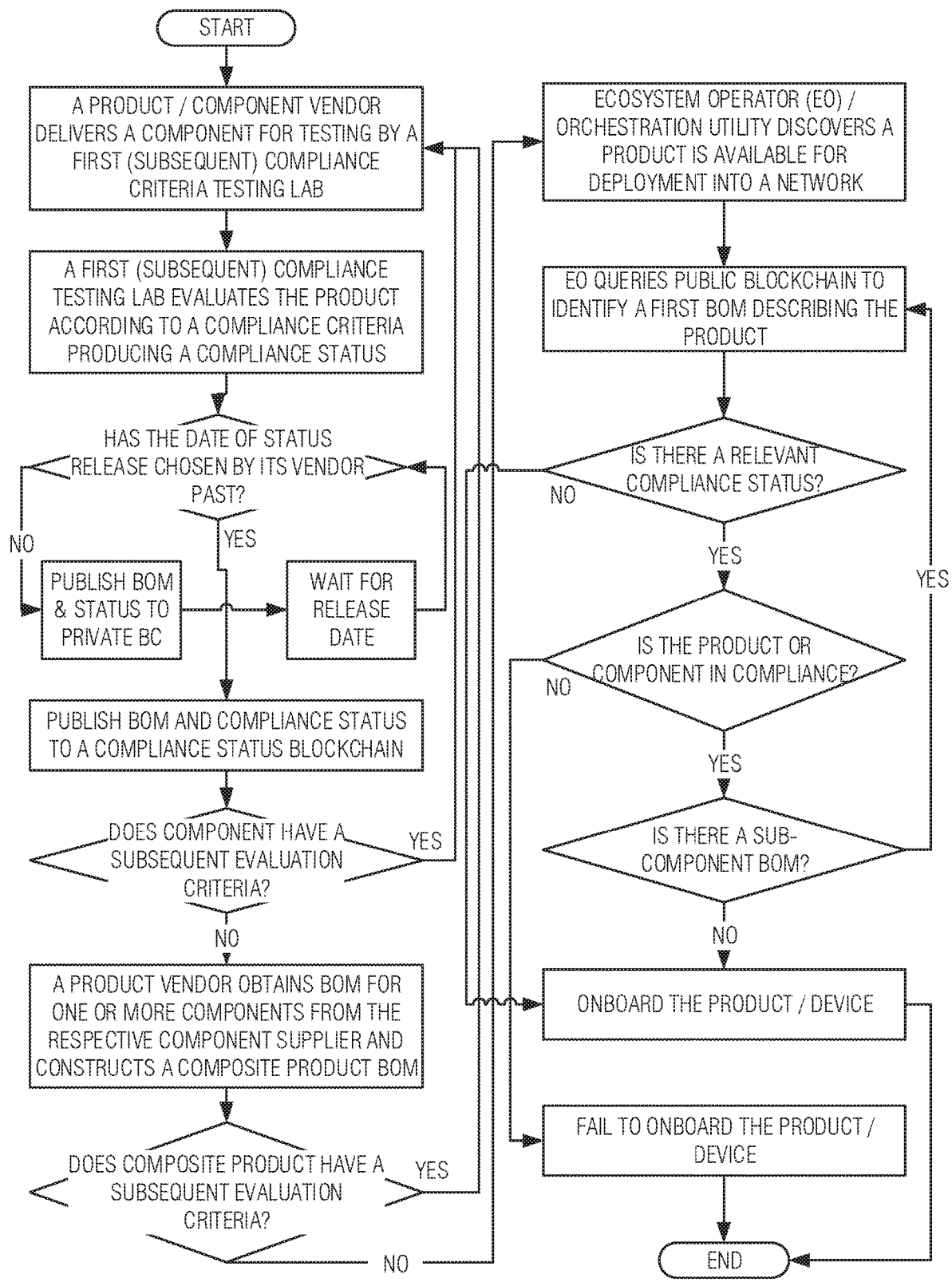
FIG. 11 illustrates a flowchart showing a technique for conformance testing using a blockchain, according to an example.

FIG. 11 illustrates a flowchart showing a technique for conformance testing using a blockchain, according to an example. FIG. 11 illustrates a method showing how a supplier in the ecosystem may submit a component for conformance testing using a public or private blockchain. A component vendor may restrict publication of the component to a public blockchain (or other public disclosure) according to a business contract. A BoM describing the component may be communicated to a second component or product that may construct a second BoM consisting in part of the first BoM. The resulting second BoM may be given to a compliance evaluation lab where a similar process for testing compliance and public disclosure is applied.

A compliant product may be available for onboarding into a user's network using an orchestration tool (e.g., ecosystem operator) that evaluates whether the product's compliance status is current. Compliance status may relate to individual sub-components of the composite product, and when relevant, the sub-component compliance status may also be checked. When all relevant status checks satisfy an orchestration policy, the product (device) is permitted on the network.

In an example, the orchestration tools may re-verify status periodically or in response to dynamic updates to the public blockchain regarding status changes.

According to the technique of FIG. 11, a product or component vendor delivers a component for testing by a first or subsequent compliance criteria testing lab. A first or subsequent compliance testing lab evaluates the product according to a compliance criteria producing a compliance status. The technique checks whether the date of status release chosen by its vendor is in the past. When the date is in the future, the technique publishes BoM and status to a private blockchain and waits for the release date.

When the date is past, the technique publishes the BoM and compliance status to a compliance status blockchain (e.g., public blockchain). The technique determines whether the component has a subsequent evaluation criteria, and when it does, repeats the previous operations for that criteria. When all criteria are satisfied, a product vendor obtains the BoM for one or more components form the respective component supplier(s) and constructs a composite product BoM. When the composite product itself has a subsequent evaluation criteria, the above operations may be repeated.

When all subsequent evaluation criteria are satisfied, the ecosystem operator discovers a product is available for deployment into a network. The ecosystem operator queries the public blockchain to identify a first BoM describing the product. The ecosystem operation may check whether there is a relevant compliance status, whether the product or component is in compliance, and whether any subcomponents have a BoM or compliance statuses that need checking. After verification of the product, component, or subcomponents are complete, the ecosystem operator may onboard the product or device. When a product, component, subcomponent, or device is not in compliance, the ecosystem operator may fail to onboard the product, component, subcomponent, or device (e.g., reject an onboarding request).

Figure 12:
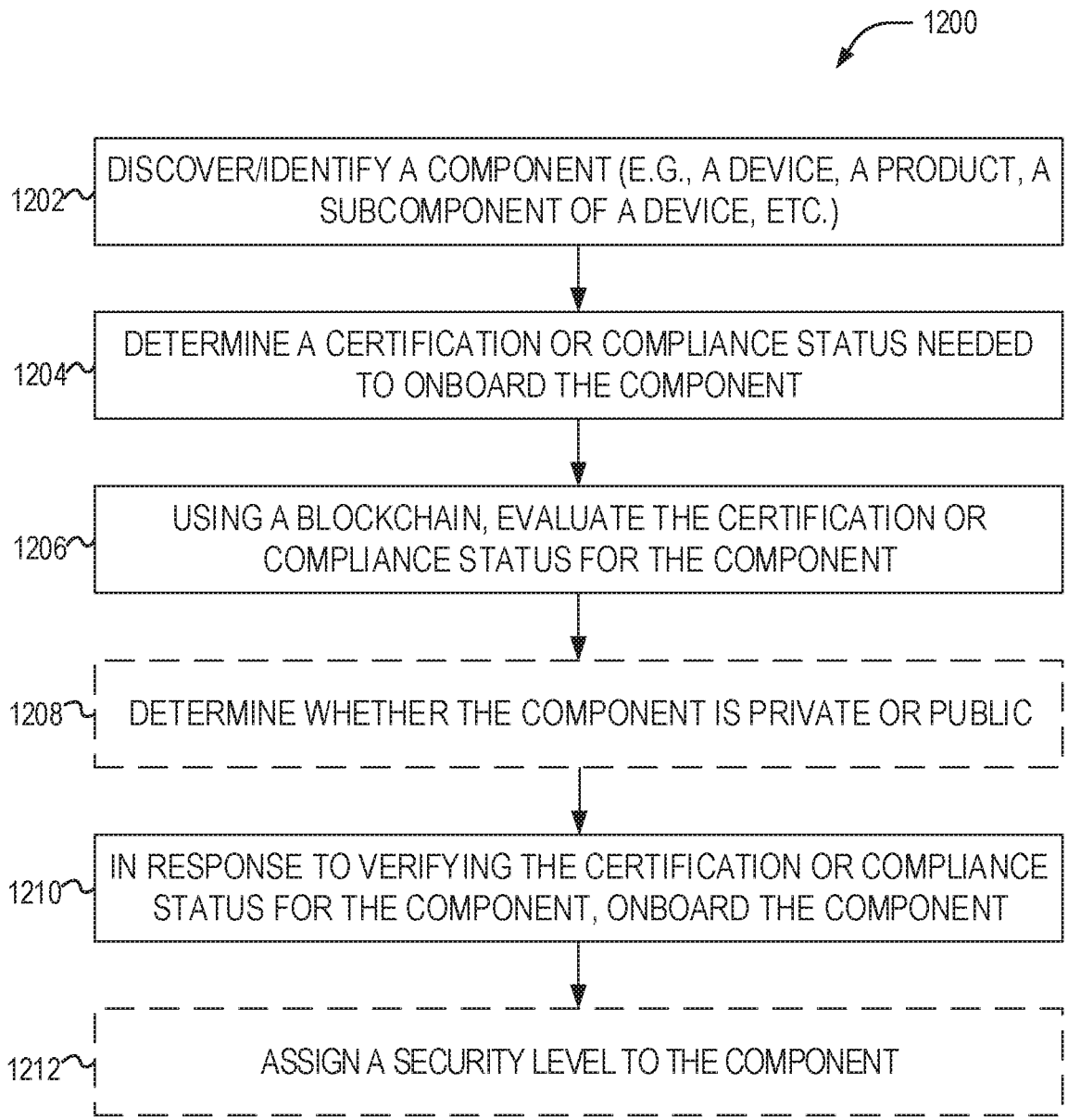
FIG. 12 illustrates a flowchart showing a technique for verifying a device identification, certification, or compliance status of a device, product, component, or subcomponent using a blockchain, according to an example.

FIG. 12 illustrates a flowchart showing a technique 1200 for verifying a device identification, certification, or compliance status of a device, product, component, or subcomponent using a blockchain, according to an example.

The technique 1200 includes an operation 1202 to discover/identify a component (e.g., a device, a product, a subcomponent of a device, etc.).

The technique 1200 includes an operation 1204 to determine a certification or compliance status (e.g., OCF certification) needed to onboard the component.

The technique 1200 includes an operation 1206 to, using a blockchain (which may be public or private, such as with respect to a release date), evaluate the certification or compliance status for the component.

The technique 1200 includes an optional operation 1208 to determine whether the component is private or public.

The technique 1200 includes an operation 1210 to, in response to verifying the certification or compliance status for the component, onboard the component. When the certification or compliance status (or device identity) is not verified or not verifiable, the technique 1200 may include not onboarding the component.

The technique 1200 concludes with an optional operation 1212 to assign a security level to the component (e.g., based on certification or compliance status).

In an example, the operations and functionality described above with reference to FIGS. 3 to 12 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a machine in the form of a computer, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 13:
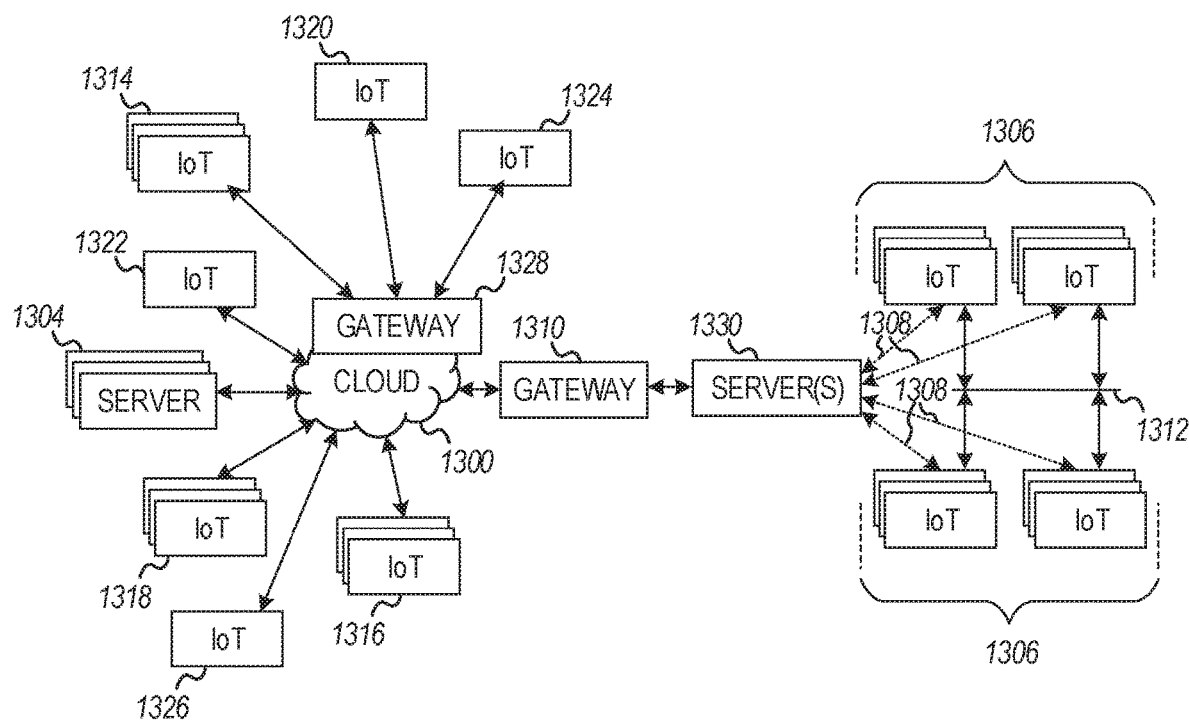
FIG. 13 illustrates a block diagram of a network illustrating communications among a number of IoT devices, according to an example.

FIG. 13 illustrates a drawing of a cloud computing network, or cloud 1300, in communication with a number of Internet of Things (IoT) devices. The cloud 1300 may represent the Internet, or may be a local area network (LAN), or a wide area network (WAN), such as a proprietary network for a company. The IoT devices may include any number of different types of devices, grouped in various combinations. For example, a traffic control group 1306 may include IoT devices along streets in a city. These IoT devices may include stoplights, traffic flow monitors, cameras, weather sensors, and the like. The traffic control group 1306, or other subgroups, may be in communication with the cloud 1300 through wired or wireless links 1308, such as LPWA links, optical links, and the like. Further, a wired or wireless sub-network 1312 may allow the IoT devices to communicate with each other, such as through a local area network, a wireless local area network, and the like. The IoT devices may use another device, such as a gateway 1310 or 1328 to communicate with remote locations such as the cloud 1300; the IoT devices may also use one or more servers 1330 to facilitate communication with the cloud 1300 or with the gateway 1310. For example, the one or more servers 1330 may operate as an intermediate network node to support a local edge cloud or fog implementation among a local area network. Further, the gateway 1328 that is depicted may operate in a cloud-to-gateway-to-many edge devices configuration, such as with the various IoT devices 1314, 1320, 1324 being constrained or dynamic to an assignment and use of resources in the cloud 1300.

Other example groups of IoT devices may include remote weather stations 1314, local information terminals 1316, alarm systems 1318, automated teller machines 1320, alarm panels 1322, or moving vehicles, such as emergency vehicles 1324 or other vehicles 1326, among many others. Each of these IoT devices may be in communication with other IoT devices, with servers 1304, with another IoT fog platform or system (not shown, but depicted in FIG. 2), or a combination therein. The groups of IoT devices may be deployed in various residential, commercial, and industrial settings (including in both private or public environments).

As may be seen from FIG. 13, a large number of IoT devices may be communicating through the cloud 1300. This may allow different IoT devices to request or provide information to other devices autonomously. For example, a group of IoT devices (e.g., the traffic control group 1306) may request a current weather forecast from a group of remote weather stations 1314, which may provide the forecast without human intervention. Further, an emergency vehicle 1324 may be alerted by an automated teller machine 1320 that a burglary is in progress. As the emergency vehicle 1324 proceeds towards the automated teller machine 1320, it may access the traffic control group 1306 to request clearance to the location, for example, by lights turning red to block cross traffic at an intersection in sufficient time for the emergency vehicle 1324 to have unimpeded access to the intersection.

Clusters of IoT devices, such as the remote weather stations 1314 or the traffic control group 1306, may be equipped to communicate with other IoT devices as well as with the cloud 1300. This may allow the IoT devices to form an ad-hoc network between the devices, allowing them to function as a single device, which may be termed a fog platform or system (e.g., as described above with reference to FIG. 2).

Figure 14:
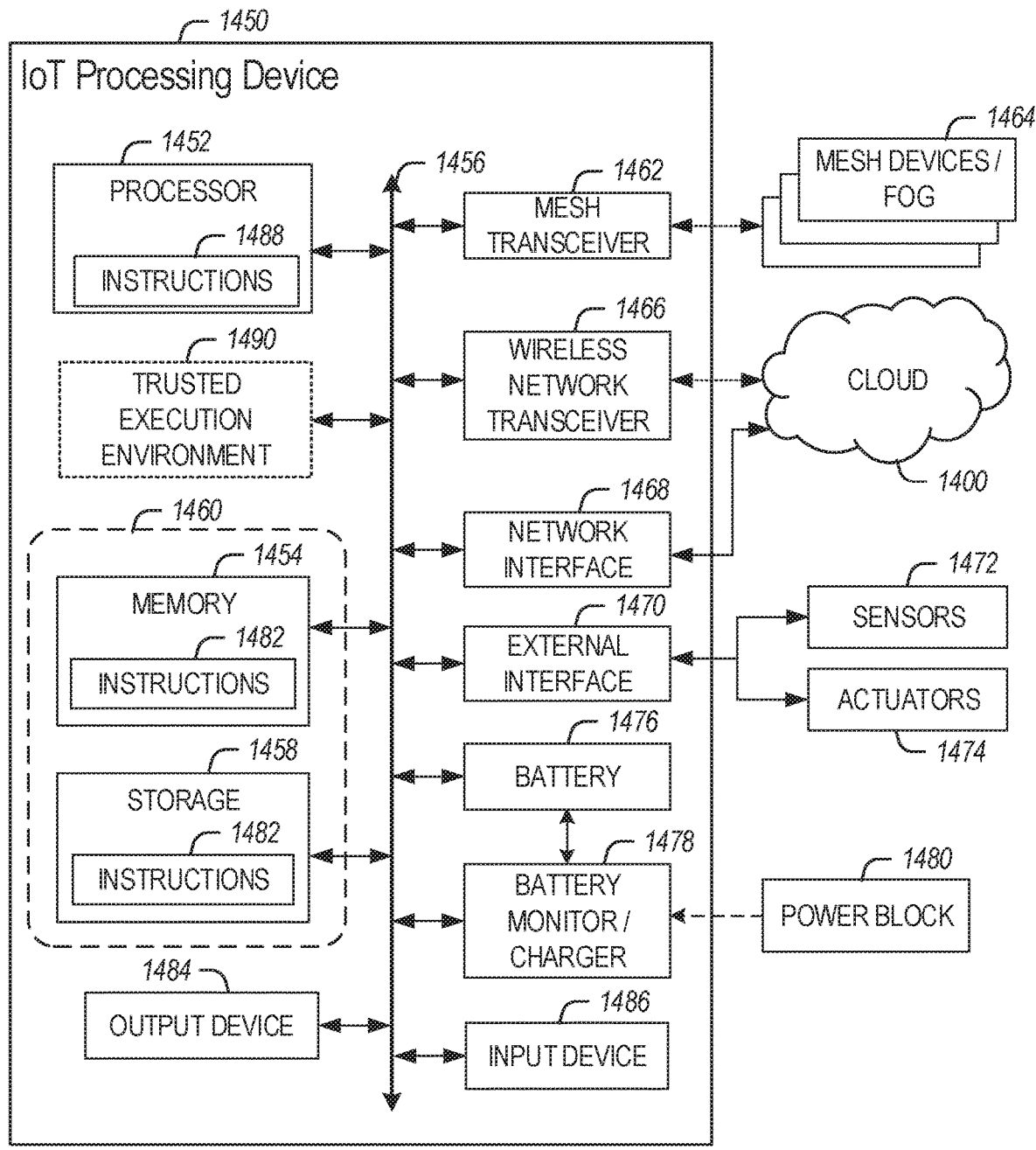
FIG. 14 illustrates a block diagram for an example IoT processing system architecture upon which any one or more of the techniques (e.g., operations, processes, methods, and methodologies) discussed herein may be performed.

FIG. 14 is a block diagram of an example of components that may be present in an IoT device 1450 for implementing the techniques described herein. The IoT device 1450 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1450, or as components otherwise incorporated within a chassis of a larger system. Additionally, the block diagram of FIG. 14 is intended to depict a high-level view of components of the IoT device 1450. However, some of the components shown may be omitted, additional components may be present, and different arrangement of the components shown may occur in other implementations.

The IoT device 1450 may include processing circuitry in the form of a processor 1452, which may be a microprocessor, a multi-core processor, a multithreaded processor, an ultra-low voltage processor, an embedded processor, or other known processing elements. The processor 1452 may be a part of a system on a chip (SoC) in which the processor 1452 and other components are formed into a single integrated circuit, or a single package, such as the Edison™ or Galileo™ SoC boards from Intel. As an example, the processor 1452 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices. Inc. (AMD) of Sunnyvale, Calif. a MIPS-based design from MIPS Technologies, Inc. of Sunnyvale, Calif., an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies. Inc., or an OMAP™ processor from Texas Instruments. Inc.

The processor 1452 may communicate with a system memory 1454 over an interconnect 1456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2. LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1458 may also couple to the processor 1452 via the interconnect 1456. In an example the storage 1458 may be implemented via a solid state disk drive (SSDD). Other devices that may be used for the storage 1458 include flash memory cards, such as SD cards, microSD cards, xD picture cards, and the like, and USB flash drives. In low power implementations, the storage 1458 may be on-die memory or registers associated with the processor 1452. However, in some examples, the storage 1458 may be implemented using a micro hard disk drive (HDD). Further, any number of new technologies may be used for the storage 1458 in addition to, or instead of, the technologies described, such resistance change memories, phase change memories, holographic memories, or chemical memories, among others.

The components may communicate over the interconnect 1456. The interconnect 1456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1456 may be a proprietary bus, for example, used in a SoC based system. Other bus systems may be included, such as an 12C interface, an SPI interface, point to point interfaces, and a power bus, among others.

The interconnect 1456 may couple the processor 1452 to a mesh transceiver 1462, for communications with other mesh devices 1464. The mesh transceiver 1462 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1464. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1462 may communicate using multiple standards or radios for communications at different range. For example, the IoT device 1450 may communicate with close devices, e.g., within about 10 meters, using a local transceiver based on BLE, or another low power radio, to save power. More distant mesh devices 1464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1466 may be included to communicate with devices or services in the cloud 1400 via local or wide area network protocols. The wireless network transceiver 1466 may be a LPWA transceiver that follows the IEEE 802.15.4, or IEEE 802.15.4g standards, among others. The IoT device 1450 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1462 and wireless network transceiver 1466, as described herein. For example, the radio transceivers 1462 and 1466 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1462 and 1466 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1466, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1468 may be included to provide a wired communication to the cloud 1400 or to other devices, such as the mesh devices 1464. The wired communication may provide an Ethernet connection, or may be based on other types of networks, such as Controller Area Network (CAN), Local Interconnect Network (LIN). DeviceNet, ControlNet, Data Highway+. PROFIBUS, or PROFINET, among many others. An additional NIC 1468 may be included to allow connect to a second network, for example, a NIC 1468 providing communications to the cloud over Ethernet, and a second NIC 1468 providing communications to other devices over another type of network.

Given the variety of types of applicable communications from the device to another component or network, applicable communications circuitry used by the device may include or be embodied by any one or more of components 1462, 1466, 1468, or 1470. Accordingly, in various examples, applicable means for communicating (e.g., receiving, transmitting, etc.) may be embodied by such communications circuitry.

The interconnect 1456 may couple the processor 1452 to an external interface 1470 that is used to connect external devices or subsystems. The external devices may include sensors 1472, such as accelerometers, level sensors, flow sensors, optical light sensors, camera sensors, temperature sensors, a global positioning system (GPS) sensors, pressure sensors, barometric pressure sensors, and the like. The external interface 1470 further may be used to connect the IoT device 1450 to actuators 1474, such as power switches, valve actuators, an audible sound generator, a visual warning device, and the like.

In some optional examples, various input/output (I/O) devices may be present within, or connected to, the IoT device 1450. For example, a display or other output device 1484 may be included to show information, such as sensor readings or actuator position. An input device 1486, such as a touch screen or keypad may be included to accept input. An output device 1484 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1450.

A battery 1476 may power the IoT device 1450, although in examples in which the IoT device 1450 is mounted in a fixed location, it may have a power supply coupled to an electrical grid. The battery 1476 may be a lithium ion battery, or a metal-air battery, such as a zinc-air battery, an aluminum-air battery, a lithium-air battery, and the like.

A battery monitor/charger 1478 may be included in the IoT device 1450 to track the state of charge (SoCh) of the battery 1476. The battery monitor/charger 1478 may be used to monitor other parameters of the battery 1476 to provide failure predictions, such as the state of health (SoH) and the state of function (SoF) of the battery 1476. The battery monitor/charger 1478 may include a battery monitoring integrated circuit, such as an LTC4020 or an LTC2990 from Linear Technologies, an ADT7488A from ON Semiconductor of Phoenix Ariz. or an IC from the UCD90xxx family from Texas Instruments of Dallas, Tex. The battery monitor/charger 1478 may communicate the information on the battery 1476 to the processor 1452 over the interconnect 1456. The battery monitor/charger 1478 may also include an analog-to-digital (ADC) convertor that allows the processor 1452 to directly monitor the voltage of the battery 1476 or the current flow from the battery 1476. The battery parameters may be used to determine actions that the IoT device 1450 may perform, such as transmission frequency, mesh network operation, sensing frequency, and the like.

A power block 1480, or other power supply coupled to a grid, may be coupled with the battery monitor/charger 1478 to charge the battery 1476. In some examples, the power block 1480 may be replaced with a wireless power receiver to obtain the power wirelessly, for example, through a loop antenna in the IoT device 1450. A wireless battery charging circuit, such as an LTC4020 chip from Linear Technologies of Milpitas, Calif. among others, may be included in the battery monitor/charger 1478. The specific charging circuits chosen depend on the size of the battery 1476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1458 may include instructions 1482 in the form of software, firmware, or hardware commands to implement the techniques described herein. Although such instructions 1482 are shown as code blocks included in the memory 1454 and the storage 1458, it may be understood that any of the code blocks may be replaced with hardwired circuits, for example, built into an application specific integrated circuit (ASIC).

In an example, the instructions 1482 provided via the memory 1454, the storage 1458, or the processor 1452 may be embodied as a non-transitory, machine readable medium 1460 including code to direct the processor 1452 to perform electronic operations in the IoT device 1450. The processor 1452 may access the non-transitory, machine readable medium 1460 over the interconnect 1456. For instance, the non-transitory, machine readable medium 1460 may be embodied by devices described for the storage 1458 of FIG. 14 or may include specific storage units such as optical disks, flash drives, or any number of other hardware devices. The non-transitory, machine readable medium 1460 may include instructions to direct the processor 1452 to perform a specific sequence or flow of actions, for example, as described with respect to the flowchart(s) and block diagram(s) of operations and functionality depicted above.

In still a specific example, the instructions 1488 on the processor 1452 (separately, or in combination with the instructions 1488 of the machine readable medium 1460) may configure execution or operation of a trusted execution environment (TEE) 1490. In an example, the TEE 1490 operates as a protected area accessible to the processor 1452 for secure execution of instructions and secure access to data. Various implementations of the TEE 1490, and an accompanying secure area in the processor 1452 or the memory 1454 may be provided, for instance, through use of Intel® Software Guard Extensions (SGX) or ARM® TrustZone® hardware security extensions. Intel® Management Engine (ME), or Intel® Converged Security Manageability Engine (CSME). Other aspects of security hardening, hardware roots-of-trust, and trusted or protected operations may be implemented in the device 1450 through the TEE 1490 and the processor 1452.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device, comprising: processing circuitry; and a memory device including instructions embodied thereon, wherein the instructions, which when executed by the processing circuitry, configure the processing circuitry to perform operations for using platform certificates to verify compliance and compatibility of a device when onboarding the device into an internet of things (IoT) network, in accordance with the techniques discussed herein.

Example 2 is a method, comprising a plurality of operations executed with a processor and memory of a device, to perform operations for using platform certificates to verify compliance and compatibility of a device when onboarding the device into an internet of things (IoT) network, in accordance with the techniques discussed herein.

Example 3 is a non-transitory device-readable storage medium including instructions, wherein the instructions, when executed by a processing circuitry of a device, cause the processing circuitry to perform operations for using platform certificates to verify compliance and compatibility of a device when onboarding the device into an internet of things (IoT) network, in accordance with the techniques discussed herein.

Example 4 is an apparatus, comprising respective means for conducting privacy-protected self-sovereign identity registration and verification procedures, in secure device onboarding of Internet of Things (IoT) devices and trusted platforms, in accordance with the techniques discussed herein.

Example 5 is a device fog adapted to perform the operations or techniques discussed herein.

Example 6 is an edge computing device adapted to perform the operations or techniques discussed herein.

Example 7 is a cloud service server adapted to perform the operations of a cloud service invoked by the operations or techniques discussed herein.

Example 8 is a device onboarding or provisioning tool or service adapted to perform the operations of onboarding or provisioning invoked by the operations or techniques discussed herein.

Example 9 is an Open Connectivity Foundation (OCF) device, configured as a server, client, or intermediary according to an OCF specification, comprising means to implement the operations or techniques discussed herein.

Example 10 is an Internet of Things (IoT) network topology, the IoT network topology comprising respective communication links adapted to perform communications for the operations or techniques discussed herein.

Example 11 is a network comprising respective devices and device communication mediums for performing any of the operations or techniques discussed herein.

Example 12 is a system comprising respective components arranged or configured to perform any of the operations or techniques discussed herein.

Example 13 is a method for using platform certificates to verify compliance and compatibility of a device when onboarding the device into an internet of things (IoT) network, the method comprising: receiving, at an onboarding tool, a request to be onboarded from the device, wherein the request includes, a platform certificate of the device; comparing elements in the platform certificate with elements from a corresponding approved product list; using a policy data store to determine whether the device should be allowed on the IoT network, when the attributes from the platform certificate match the corresponding attributes in the corresponding approved product list; and onboarding the device to the IoT network in response to the device satisfying policies in the policy data store.

In Example 14, the subject matter of Example 13 includes, wherein the elements comprise platform attributes, container attributes, device attributes, conformance status, or security profile attributes, including optionally where the elements are arranged in a certificate according to a specification of a Trusted Computing Group (TCG) standards family.

Example 15 is a system for using platform certificates to verify compliance and compatibility of a device when onboarding the device into an internet of things (IoT) network, the system comprising: a policy data store; and an onboarding tool to: receive a request to be onboarded from the device, wherein the request includes, a platform certificate of the device; compare elements in the platform certificate with elements from a corresponding approved product list; use the policy data store to determine whether the device is trusted for onboarding on the IoT network by determining whether the elements from the platform certificate match the corresponding elements in the corresponding approved product list; and onboard the device to the IoT network in response to a determination that the elements from the platform certificate match the corresponding elements in the corresponding approved product list.

In Example 16, the subject matter of Example 15 includes, wherein the elements in the platform certificate comprise platform attributes, container attributes, device attributes, conformance status, or security profile attributes, including optionally where the platform certificate is arranged according to a specification of a Trusted Computing Group (TCG) standards family.

In Example 17, the subject matter of Example 16 includes, wherein to onboard the device, the onboarding tool is configured to determine that the elements from the platform certificate match the corresponding elements in the corresponding approved product list for all the platform attributes, the container attributes, the device attributes, the conformance status, and the security profile attributes identified for the device.

In Example 18, the subject matter of Examples 15-17 includes, wherein the onboarding tool is further to, when a change to the approved product list is identified for the device, dynamically change a certification status of the device, and when at least one element from the platform certificate no longer matches a corresponding element in the changed approved product list, remove the device from the IoT network.

In Example 19, the subject matter of Examples 15-18 includes, wherein the onboarding tool is further to verify, at the onboarding tool, that the approved product list applies to the device using a local management console, a blockchain, or a blacklist.

In Example 20, the subject matter of Example 19 includes, wherein to verify that the approved product list applies to the device, the onboarding tool is further configured to verify a digital signature of the approved product list.

In Example 21, the subject matter of Examples 19-20 includes, wherein to verify that the approved product list applies to the device, the onboarding tool is further configured to use a hash-tree structure.

In Example 22, the subject matter of Examples 19-21 includes, wherein to verify that the approved product list applies to the device, the onboarding tool is further configured to verify a manufacturing key that was embedded, by a platform vendor, in secure hardware of the device.

In Example 23, the subject matter of Examples 19-22 includes, wherein the onboarding tool is further to verify, at the onboarding tool, that the approved product list applies to the device using the blockchain, wherein the onboarding tool has read access only to the blockchain and a platform vendor has write only access to the blockchain.

In Example 24, the subject matter of Example 23 includes, wherein the blockchain is a private blockchain including nonpublic supply chain information that is embargoed until a release date of a component of the device.

In Example 25, the subject matter of Examples 23-24 includes, wherein the blockchain includes information corresponding to platform certificates or approved product lists of a plurality of devices.

In Example 26, the subject matter of Examples 15-25 includes, wherein the approved product list is maintained by an IoT device certifying entity.

In Example 27, the subject matter of Examples 15-26 includes, wherein the platform certificate is a configuration maintained by a platform vendor that assembled components of the device.

Example 28 is a method for using platform certificates to verify compliance and compatibility of a device when onboarding the device into an internet of things (IoT) network, the method comprising: receiving, at an onboarding tool, a request to be onboarded from the device, wherein the request includes, a platform certificate of the device; comparing elements in the platform certificate with elements from a corresponding approved product list; using a policy data store to determine whether the device is trusted for onboarding on the IoT network by determining whether the elements from the platform certificate match the corresponding elements in the corresponding approved product list; and onboarding the device to the IoT network in response to determining that the elements from the platform certificate match the corresponding elements in the corresponding approved product list.

In Example 29, the subject matter of Example 28 includes, wherein the elements in the platform certificate comprise platform attributes, container attributes, device attributes, conformance status, or security profile attributes, including optionally where the platform certificate is arranged according to a specification of a Trusted Computing Group (TCG) standards family.

In Example 30, the subject matter of Example 29 includes, wherein onboarding the device includes determining that the elements from the platform certificate match the corresponding elements in the corresponding approved product list for all the platform attributes, the container attributes, the device attributes, the conformance status, and the security profile attributes identified for the device.

In Example 31, the subject matter of Examples 28-30 includes, when a change to the approved product list is identified for the device, dynamically changing a certification status of the device, and when at least one element from the platform certificate no longer matches a corresponding element in the changed approved product list, removing the device from the IoT network.

In Example 32, the subject matter of Examples 28-31 includes, verifying, at the onboarding tool, that the approved product list applies to the device using a local management console, a public blockchain, or a blacklist.

In Example 33, the subject matter of Example 32 includes, wherein verifying that the approved product list applies to the device includes verifying a digital signature of the approved product list.

In Example 34, the subject matter of Examples 32-33 includes, wherein verifying that the approved product list applies to the device includes using a hash-tree structure.

In Example 35, the subject matter of Examples 32-34 includes, wherein verifying that the approved product list applies to the device includes verifying a manufacturing key that was embedded, by a platform vendor, in secure hardware of the device.

In Example 36, the subject matter of Examples 28-35 includes, wherein the approved product list is maintained by an IoT device certifying entity.

In Example 37, the subject matter of Examples 28-36 includes, wherein the platform certificate is a configuration maintained by a platform vendor that assembled components of the device.

Example 38 is a machine-readable medium including instructions for using platform certificates to verify compliance and compatibility of a device when onboarding the device into an internet of things (IoT) network, the instructions, when executed, causing a processor of an onboarding too to: receive a request to be onboarded from the device, wherein the request includes, a platform certificate of the device; compare elements in the platform certificate with elements from a corresponding approved product list; use a policy data store to determine whether the device is trusted for onboarding on the IoT network by determining whether the elements from the platform certificate match the corresponding elements in the corresponding approved product list; and onboard the device to the IoT network in response to determining that the elements from the platform certificate match the corresponding elements in the corresponding approved product list.

In Example 39, the subject matter of Example 38 includes, wherein the elements in the platform certificate comprise platform attributes, container attributes, device attributes, conformance status, or security profile attributes, including optionally where the platform certificate is arranged according to a specification of a Trusted Computing Group (TCG) standards family.

In Example 40, the subject matter of Example 39 includes, wherein to onboard the device, the instructions further cause the processor to determine that the elements from the platform certificate match the corresponding elements in the corresponding approved product list for all the platform attributes, the container attributes, the device attributes, the conformance status, and the security profile attributes identified for the device.

In Example 41, the subject matter of Examples 38-40 includes, wherein the instructions further cause the processor to, when a change to the approved product list is identified for the device, dynamically change a certification status of the device, and when at least one element from the platform certificate no longer matches a corresponding element in the changed approved product list, remove the device from the IoT network.

In Example 42, the subject matter of Examples 38-41 includes, wherein the instructions further cause the processor to verify, at the onboarding tool, that the approved product list applies to the device using a local management console, a public blockchain, or a blacklist.

In Example 43, the subject matter of Example 42 includes, wherein to verify that the approved product list applies to the device, the instructions further cause the processor to verify a digital signature of the approved product list.

In Example 44, the subject matter of Examples 42-43 includes, wherein to verify that the approved product list applies to the device, the instructions further cause the processor to use a hash-tree structure.

In Example 45, the subject matter of Examples 42-44 includes, wherein to verify that the approved product list applies to the device, the instructions further cause the processor to verify a manufacturing key that was embedded, by a platform vendor, in secure hardware of the device.

In Example 46, the subject matter of Examples 38-45 includes, wherein the approved product list is maintained by an IoT device certifying entity.

In Example 47, the subject matter of Examples 38-46 includes, wherein the platform certificate is a configuration maintained by a platform vendor that assembled components of the device.

Example 48 is at least one machine-readable medium including instructions that, when executed by processing circuitry, cause the processing circuitry to perform operations to implement of any of Examples 1-47.

Example 49 is an apparatus comprising means to implement of any of Examples 1-47.

Example 50 is a system to implement of any of Examples 1-47.

Example 51 is a method to implement of any of Examples 1-47.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A system for using platform certificates to verify compliance and compatibility of a device when onboarding the device into an internet of things (IoT) network, the system comprising:
   memory including a policy data store; and
   processing circuitry of an onboarding tool device to:
   receive a request to be onboarded from the device, wherein the request includes a platform certificate of the device;
   compare elements in the platform certificate with elements from a corresponding approved product list;
   use the policy data store to determine whether the device is trusted for onboarding on the IoT network by determining whether the elements from the platform certificate match the corresponding elements in the corresponding approved product list;
   onboard the device to the IoT network in response to a determination that the elements from the platform certificate correspond to the elements in the approved product list; and
   when a change to the approved product list is identified for the device, dynamically change a certification status of the device, wherein when at least one element from the platform certificate no longer matches a corresponding element in the changed approved product list, remove the device from the IoT network.

2. The system of claim 1, wherein the elements in the platform certificate comprise platform attributes, container attributes, device attributes, conformance status, or security profile attributes.

3. The system of claim 2, wherein to onboard the device, the processing circuitry of the onboarding tool device is configured to determine that the elements from the platform certificate match the corresponding elements in the corresponding approved product list for all the platform attributes, the container attributes, the device attributes, the conformance status, and the security profile attributes identified for the device.

4. The system of claim 1, wherein the processing circuitry of the onboarding tool device is further to verify that the approved product list applies to the device using a local management console, a blockchain, or a blocklist.

5. The system of claim 4, wherein to verify that the approved product list applies to the device, the processing circuitry of the onboarding tool device is further configured to verify a digital signature of the approved product list.

6. The system of claim 4, wherein to verify that the approved product list applies to the device, the processing circuitry of the onboarding tool device is further configured to use a hash-tree structure.

7. The system of claim 4, wherein to verify that the approved product list applies to the device, the processing circuitry of the onboarding tool device is further configured to verify a manufacturing key that was embedded, by a platform vendor, in secure hardware of the device.

8. The system of claim 4, wherein the processing circuitry of the onboarding tool device is further to verify, at the processing circuitry of the onboarding tool device, that the approved product list applies to the device using the blockchain, wherein the processing circuitry of the onboarding tool device has read access only to the blockchain and a platform vendor has write only access to the blockchain.

9. The system of claim 8, wherein the blockchain is a private distributed ledger including nonpublic supply chain information that is embargoed until a release date of a component of the device.

10. The system of claim 8, wherein the blockchain includes information corresponding to platform certificates or approved product lists of a plurality of devices.

11. The system of claim 1, wherein the approved product list is maintained by an IoT device certifying entity.

12. The system of claim 1, wherein the platform certificate is a configuration maintained by a platform vendor that assembled components of the device.

13. A method for using platform certificates to verify compliance and compatibility of a device when onboarding the device into an internet of things (IoT) network, the method comprising:
    receiving, at an onboarding tool, a request to be onboarded from the device, wherein the request includes a platform certificate of the device;
    comparing elements in the platform certificate with elements from a corresponding approved product list;
    using a policy data listing to determine whether the device is trusted for onboarding on the IoT network by determining whether the elements from the platform certificate match the corresponding elements in the corresponding approved product list;
    onboarding the device to the IoT network in response to determining that the elements from the platform certificate match the corresponding elements in the corresponding approved product list; and
    when a change to the approved product list is identified for the device, dynamically changing a certification status of the device, wherein when at least one element from the platform certificate no longer matches a corresponding element in the changed approved product list, remove the device from the IoT network.

14. The method of claim 13, wherein the elements in the platform certificate comprise platform attributes, container attributes, device attributes, conformance status, or security profile attributes, wherein the platform certificate is arranged according to a specification of a Trusted Computing Group (TCG) standards family.

15. The method of claim 14, wherein onboarding the device includes determining that the elements from the platform certificate match the corresponding elements in the corresponding approved product list for all the platform attributes, the container attributes, the device attributes, the conformance status, and the security profile attributes identified for the device.

16. The method of claim 13, further comprising, when a change to the approved product list is identified for the device, dynamically changing a certification status of the device, and when at least one element from the platform certificate no longer matches a corresponding element in the changed approved product list, removing the device from the IoT network.

17. The method of claim 13, further comprising verifying, at the onboarding tool, that the approved product list applies to the device using a local management console, a public blockchain, or a blacklist.

18. The method of claim 17, wherein verifying that the approved product list applies to the device includes verifying a digital signature of the approved product list.

19. The method of claim 17, wherein verifying that the approved product list applies to the device includes using a hash-tree structure.

20. The method of claim 17, wherein verifying that the approved product list applies to the device includes verifying a manufacturing key that was embedded, by a platform vendor, in secure hardware of the device.

21. A non-transitory machine-readable medium including instructions for using platform certificates to verify compliance and compatibility of a device when onboarding the device into an internet of things (IoT) network, the instructions, when executed, causing a processor of an onboarding tool to:

receive a request to be onboarded from the device, wherein the request includes a platform certificate of the device;

compare elements in the platform certificate with elements from a corresponding approved product list;

use a policy data listing to determine whether the device is trusted for onboarding on the IoT network by determining whether the elements from the platform certificate match the corresponding elements in the corresponding approved product list;

onboard the device to the IoT network in response to determining that the elements from the platform certificate match the corresponding elements in the corresponding approved product list;

when a change to the approved product list is identified for the device, dynamically change a certification status of the device, wherein when at least one element from the platform certificate no longer matches a corresponding element in the changed approved product list, remove the device from the IoT network.

22. The machine-readable medium of claim 21, wherein the elements in the platform certificate comprise platform attributes, container attributes, device attributes, conformance status, or security profile attributes, wherein the platform certificate is arranged according to a specification of a Trusted Computing Group (TCG) standards family.

* * * * *